US 8,560,658 B2

(12) United States Patent
Bedare et al.

(10) Patent No.: US 8,560,658 B2
(45) Date of Patent: Oct. 15, 2013

(54) MANAGING DISTRIBUTED ADDRESS POOLS WITHIN NETWORK DEVICES

(75) Inventors: Milind Bedare, Bangalore (IN); Soumya Kailasa, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 597 days.

(21) Appl. No.: 12/729,979

(22) Filed: Mar. 23, 2010

(65) Prior Publication Data
US 2011/0238793 A1 Sep. 29, 2011

(51) Int. Cl.
*G06F 15/173* (2006.01)
(52) U.S. Cl.
USPC ........... 709/223; 709/220; 709/245; 370/338; 370/329
(58) Field of Classification Search
USPC ........................................ 709/220
See application file for complete search history.

(56) References Cited

U.S. PATENT DOCUMENTS

| | | | | |
|---|---|---|---|---|
| 6,243,749 | B1 * | 6/2001 | Sitaraman et al. | 709/223 |
| 6,578,074 | B1 | 6/2003 | Bahlmann | |
| 6,957,276 | B1 | 10/2005 | Bahl | |
| 6,982,953 | B1 | 1/2006 | Swales | |
| 7,178,059 | B2 | 2/2007 | Greenspan et al. | |
| 7,197,549 | B1 * | 3/2007 | Salama et al. | 709/223 |
| 7,292,538 | B1 | 11/2007 | O'Rourke et al. | |
| 7,321,893 | B1 | 1/2008 | Rambacher et al. | |
| 7,386,629 | B2 | 6/2008 | Rover et al. | |
| 7,533,165 | B2 | 5/2009 | Makino | |
| 7,624,181 | B2 | 11/2009 | Townsley et al. | |
| 7,648,070 | B2 | 1/2010 | Droms et al. | |
| 7,792,942 | B1 | 9/2010 | Regan et al. | |
| 7,991,863 | B2 | 8/2011 | Zhao | |

(Continued)

FOREIGN PATENT DOCUMENTS

| | | | |
|---|---|---|---|
| JP | 2004356920 A | * | 12/2004 |
| WO | 03081875 A1 | | 10/2003 |
| WO | 2005050897 A2 | | 6/2005 |

OTHER PUBLICATIONS

Juniper Networks, Inc., "JUNOS Software Subscriber Access Configuration Guide—DHCP Auto Logout Overview", Release 9.4, Jan. 15, 2009, retrieved from the internet: URL: http://www.juniper.net/techpubs/en_US/junos9.4/information-products/topic-collections/subscriber-access/swconfig-subscriber-access.pdf, 38 pp.

(Continued)

*Primary Examiner* — Firmin Backer
*Assistant Examiner* — Natisha Cox
(74) *Attorney, Agent, or Firm* — Shumaker & Sieffert, P.A.

(57) ABSTRACT

In general, techniques are described for managing distributed address pools within network devices. A network device that includes a control unit and at least one interface may implement these techniques. The control unit stores data defining a network address pool shared by both the network device and another network device. The control unit includes a shared pool manager module that evaluates the data defining the network address pool to determine a block of addresses of the network address pool that is not in use by the other network device. The at least one interface transmits a request to the other network device requesting the determined block and receives a response from the other network device indicating whether one or more addresses of the requested block are available. The control unit then allocates one or more addresses from the requested block to subscriber devices based on the indication in the response.

30 Claims, 6 Drawing Sheets

(56) References Cited

U.S. PATENT DOCUMENTS

| | | | |
|---|---|---|---|
| 8,036,237 B2 | 10/2011 | Kolli et al. | |
| 2003/0076805 A1* | 4/2003 | Agrawal et al. | 370/338 |
| 2005/0044273 A1 | 2/2005 | Bouchat et al. | |
| 2005/0097223 A1* | 5/2005 | Shen et al. | 709/245 |
| 2005/0122946 A1* | 6/2005 | Won | 370/338 |
| 2005/0253718 A1 | 11/2005 | Droms et al. | |
| 2005/0253722 A1 | 11/2005 | Droms et al. | |
| 2006/0031488 A1 | 2/2006 | Swales | |
| 2006/0047791 A1 | 3/2006 | Bahl | |
| 2006/0155563 A1 | 7/2006 | Banerjee et al. | |
| 2007/0002833 A1 | 1/2007 | Bajic | |
| 2007/0180499 A1 | 8/2007 | Van Bemmel | |
| 2007/0203999 A1 | 8/2007 | Townsley et al. | |
| 2007/0214352 A1 | 9/2007 | Convery et al. | |
| 2008/0046597 A1 | 2/2008 | Stademann et al. | |
| 2008/0065747 A1 | 3/2008 | Kubota | |
| 2009/0154406 A1* | 6/2009 | Kim et al. | 370/329 |
| 2009/0257425 A1 | 10/2009 | Sastry et al. | |
| 2010/0042707 A1 | 2/2010 | Zhao | |
| 2010/0042714 A1 | 2/2010 | Choi et al. | |

OTHER PUBLICATIONS

Droms, R., "Dynamic Host Configuration Protocol", Network Working Group, RFC 2131, Mar. 1997, 46 pp.

Alexander, S. et al., "DHCP Options and BOOIP Vendor Extensions", Network Working Group, RFC 2132, Mar. 1997, 35 pp.

Patrick, M., "DHCP Relay Agent Information Option", Network Working Group, RFC 3046, Jan. 2001, 15 pp.

McAuley et al. "Experience with Autoconfiguring a Network with IP Addresses", Proceedings: Communications for Network-Centric Operations: Creating the Information Force, Oct. 28-30, 2001, Mclean, VA, Telcordia Technologies, Inc., 2001, p. 272-276.

Droms, R. and R. Cole, "An Inter-server Protocol for DHCP; draft-ietf-dhc-interserver-01.txt" Network Working Group, Internet Draft, Mar. 1997, p. 1-31.

Extended European Search Report for European application No. 10186815.6 dated Jul. 5, 2011, p. 6.

Translation of Office Action mailed Mar. 21, 2013 in corresponding CN Application No. 201010530108.3, 32 pgs.

* cited by examiner

MANAGING DISTRIBUTED ADDRESS POOLS WITHIN NETWORK DEVICES

TECHNICAL FIELD

The invention relates to computer networks and, more particularly, to reserving addresses within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

To route the packets through the computer network, each network device may be assigned an address that uniquely identifies each of the requesting network devices. Each packet may then include a source address uniquely identifying the network device that originated the packet and a destination address uniquely identifying the network device to which the packet is destined. Intermediate devices, referred to as routers, may route the packets to the destination device based on the destination address included within the packet.

Typically, each network device, upon attempting to access the network, may request configuration information that includes an Internet Protocol (IP) address in accordance with a Dynamic Host Configuration Protocol (DHCP). For example, a subscriber device (e.g., a cable modem, a digital television setup box, a Digital Subscriber Line (DSL) modem) may request a layer three IP network address by issuing a DHCP request to a DHCP server. Often, access routers located near the requesting subscribe device implement what is referred to as a "local" DCHP server to service these DHCP requests. A DHCP server implemented by an access router is considered local in that it is positioned within the same sub-network as that of the requesting subscriber device. Because these DHCP servers are local, the servers implemented by the access routers may more quickly respond to the DHCP server requests issued by the client network devices.

While local DHCP servers usually improve response times with respect to DHCP requests, these local DHCP servers may be more difficult to administer and waste address resources. For example, each of these local DHCP servers typically needs to be configured to allocate IP addresses from a different portion of an IP address space assigned to the enterprise. Misconfiguring any of the DHCP servers such that two or more of the servers have portions that overlap may cause significant network conflicts as two different subscriber devices may be assigned the same IP address, thereby preventing routers from being able to individually route traffic to one or the other of these devices. In addition, any given local DHCP server typically only utilizes a small amount of its assigned portion of the IP address space at any one time. This wastes address resources in that the unused addresses in the assigned portion could be used by another local DHCP server.

To avoid the administrative difficulty and address waste associated with local DHCP servers, a central DHCP server is often employed to centrally allocate addresses from the IP address space. Rather than divide the IP address space into portions, the central DHCP server receives the DHCP requests from the routers, reserves an address from the centrally maintained IP address space, and forwards the reserved address to the requesting subscriber devices effectively assigning the reserved address to these subscriber devices remotely. While more easy to administer than local DHCP servers implemented by routers, the central DHCP server is often implemented as a stand-alone device, which increases costs considering that another device in addition to the routers need be purchased to implement the central DHCP server. Moreover, the central DHCP server typically cannot respond to DHCP requests as quickly as the local DHCP servers due to its central, rather than local, location.

SUMMARY

In general, techniques are described for implementing a distributed address pool within a computer network. This distributed address pool may represent a virtual address pool in that the address pool is shared by two or more different network devices that implement an address allocation mechanism, such as a dynamic host configuration protocol (DHCP) implemented by a DHCP server. These network devices are typically located local to the subscriber devices so as to more quickly respond to DHCP requests. In this sense, the techniques facilitate implementations of local DHCP servers that reside in the same sub-network (or so-called "subnet") as the subscriber devices. Moreover, the techniques facilitate implementations of this virtual distributed address pool that provide an automated mechanism for sharing individual assigned addresses among the local DHCP servers such that each address may only be assigned once, thereby avoiding address conflicts without increasing administrative burdens. For example, the techniques may be used to automatically, without repeated administrative input, maintain the local DHCP servers in an updated state with respect to unassigned portions or blocks of the enterprise-wide IP address space so as to avoid address conflicts within the network yet allow individual network addresses to be assigned by any of the local DHCP servers. Consequently, the techniques may enable a local DHCP implementation capable of quickly responding to DHCP requests without the burdensome administrative oversight normally associated with maintaining local DHCP servers.

In one embodiment, a method for sharing a network address pool comprises storing, with a first network device, data that 1) defines the network address pool shared by both the first network device and a second network device and 2) individual addresses of the network address pool reserved for use by the first and second network devices in allocating the respective individual addresses to one or more subscriber devices coupled to the first and second network devices and evaluating, with the first network device, the data that defines the network address pool to determine a block of addresses identified by the data that defines the network address pool that is not currently reserved for use by the second network device in allocating addresses from the identified particular block of addresses to the one or more subscriber devices coupled to the second network device. The method also comprises transmitting, with the first network device, a request to the second network device requesting that the determined block of addresses within the network address pool be reserved for use by the first network device in allocating addresses from the requested block to the one or more subscriber devices coupled to the first network device and receiving, with the first network device, a response from the second network device indicating whether one or more addresses of the requested block of addresses is available for use by the first network device in allocating addresses from the requested block to the one or more subscriber devices. The method further includes updating, with the first network device, the data that defines the network address pool to reflect that the block of addresses has been reserved for use by the first network device based on the indication in the response received from the second network device, and when the data has been updated to reflect that the block of addresses has been reserved for use by the first network device, allocating one or more addresses from the reserved block of addresses with the first network device in response to a request by one of the one or more subscriber devices for one or more addresses.

In another embodiment, a network device comprises a control unit that stores data that 1) defines a network address pool shared by both a first network device and a second network device and 2) individual addresses of the network address pool reserved for use by the first and second network devices in allocating the respective individual addresses to one or more subscriber devices coupled to the first and second network devices. The network device comprises the first network device. The control unit includes a shared pool manager module that evaluates the data that defines the network address pool to determine a block of addresses identified by the data that defines the network address pool that is not currently reserved for use by the second network device in allocating addresses from the identified particular block of addresses to the one or more subscriber devices coupled to the second network device. The network device referred to as the first network device also includes at least one interface that transmits a request to the second network device requesting that the determined block of addresses within the network address pool be reserved for use by the first network device in allocating addresses from the requested block to the one or more subscriber devices coupled to the first network device, and receives a response from the second network device indicating whether one or more addresses of the requested block of addresses is available for use by the first network device in allocating addresses from the requested block to the one or more subscriber devices. The shared pool manager module updates the data that defines the network address pool to reflect that the block of addresses has been reserved for use by the first network device based on the indication in the response received from the second network device. The control unit, when the data has been updated to reflect that the block of addresses has been reserved for use by the first network device, allocates one or more addresses from the reserved block of addresses in response to a request by one of the one or more subscriber devices for one or more addresses.

In another embodiment, a network system comprises a first set of subscriber devices, a first network device coupled to the first set of subscriber devices, a second set of subscriber devices different from the first set of subscriber devices, and a second network device different from the first network device that couples to the second set of subscriber devices. The first network device includes a control unit that stores data that 1) defines a network address pool shared by both a first network device and a second network device and 2) individual addresses of the network address pool reserved for use by the first and second network devices in allocating the respective individual addresses to one or more subscriber devices coupled to the first and second network devices. The control unit includes a shared pool manager module that evaluates the data that defines the network address pool to determine a block of addresses identified by the data that defines the network address pool that is not currently reserved for use by the second network device in allocating addresses from the identified particular block of addresses to the one or more subscriber devices coupled to the second network device. The first network device also includes at least one interface that transmits a request to the second network device requesting that the determined block of addresses within the network address pool be reserved for use by the first network device in allocating addresses from the requested block to the one or more subscriber devices coupled to the first network device, and receives a response from the second network device indicating whether one or more addresses of the requested block of addresses is available for use by the first network device in allocating addresses from the requested block to the one or more subscriber devices. The shared pool manager module updates the data that defines the network address pool to reflect that the block of addresses has been reserved for use by the first network device based on the indication in the response received from the second network device. The control unit, when the data has been updated to reflect that the block of addresses has been reserved for use by the first network device, allocates one or more addresses from the reserved block of addresses in response to a request by one of the one or more subscriber devices for one or more addresses.

In another embodiment, a computer-readable medium comprises instructions for causing a programmable processor to store, with a first network device, data that 1) defines a network address pool shared by both the first network device and a second network device and 2) individual addresses of the network address pool reserved for use by the first and second network devices in allocating the respective individual addresses to one or more subscriber devices coupled to the first and second network devices and evaluate, with the first network device, the data that defines the network address pool to determine a block of addresses identified by the data that defines the network address pool that is not currently reserved for use by the second network device in allocating addresses from the identified particular block of addresses to the one or more subscriber devices coupled to the second network device. The instructions further cause the processor to transmit, with the first network device, a request to the second network device requesting that the determined block of addresses within the network address pool be reserved for use by the first network device in allocating addresses from the requested block to the one or more subscriber devices coupled to the first network device and receive, with the first network device, a response from the second network device indicating whether one or more addresses of the requested block of addresses is available for use by the first network device in allocating addresses from the requested block to the one or more subscriber devices. The instructions also cause the processor to update, with the first network device, the data that defines the network address pool to reflect that the block of addresses has been reserved for use by the first network device based on the indication in the response received from the second network device, and when the data has been updated to reflect that the block of addresses has been reserved for use by the first network device, allocate one or more addresses from the reserved block of addresses with the first network device in response to a request by one of the one or more subscriber devices for one or more addresses.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
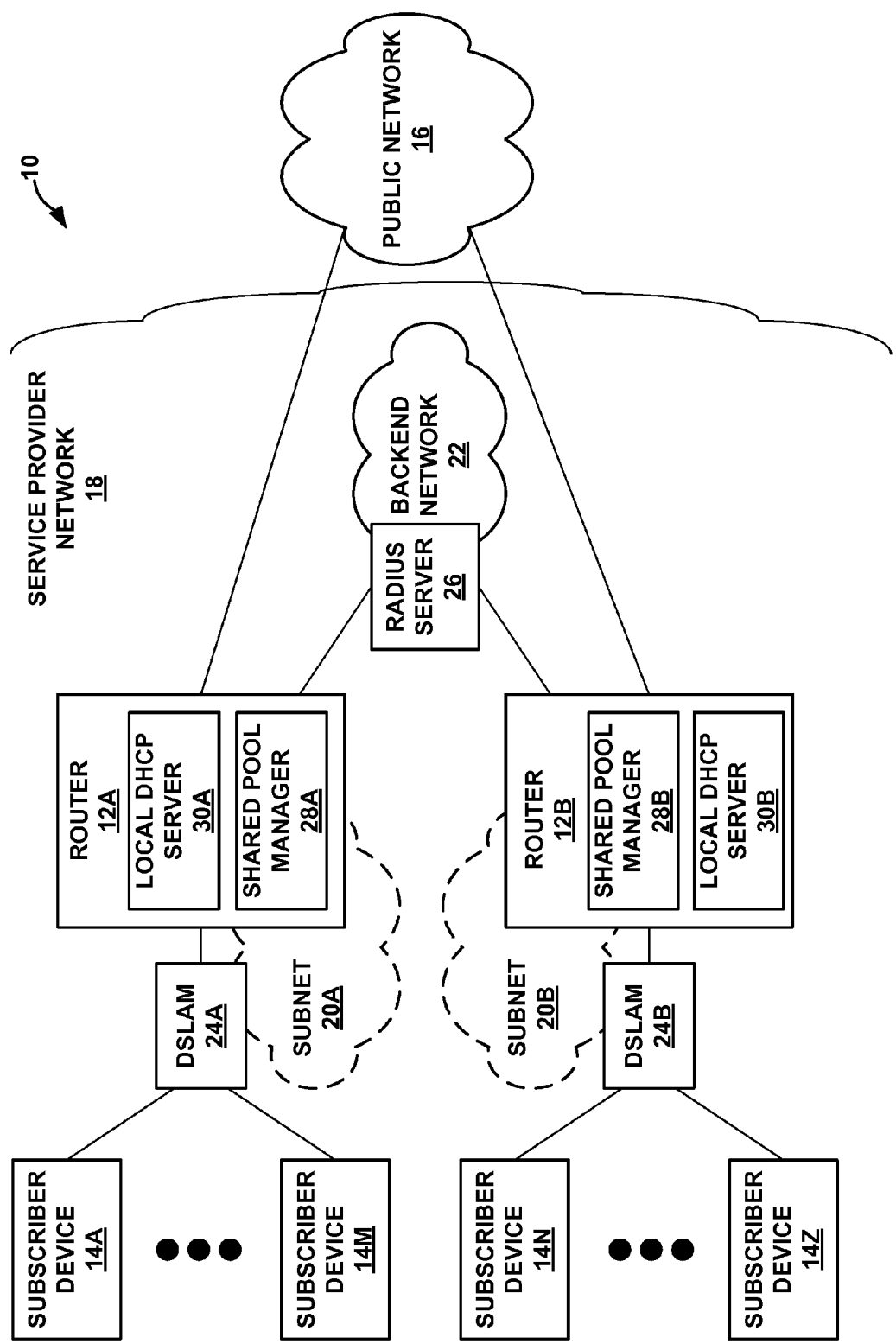
FIG. 1 is a block diagram illustrating an example network system in which routers implement the techniques of this disclosure to manage distributed address pools.

FIG. 1 is a block diagram illustrating an example network system 10 in which routers 12A, 12B implement the techniques of this disclosure to manage distributed address pools. Routers 12A, 12B ("routers 12") each represents an example of a network device capable of performing the techniques of this disclosure. While described with respect to these example network devices, any network device positioned locally to subscriber devices, such as subscriber devices 14A-14Z ("subscriber devices 14"), may implement the techniques of this disclosure to manage distributed address pools for the purposes of allocating addresses from a local network device to subscriber devices 14. Examples of other devices that may implement the distributed address pool management techniques described herein include an access gateway, a home office router, a switch, a hub, a digital subscriber line access multiplexer (DSLAM) device, a cable modem termination system (CMTS), a wireless access point (WAP), a networked desktop computer, and a networked laptop computer. Consequently, the techniques should not be limited in this respect to the examples described in this disclosure.

As shown in FIG. 1, network system 10 includes a public network 16 and service provider network 18. Public network 16 represents a computer network available to the public, such as the public network commonly referred to as the Internet. Although not shown in the example of FIG. 1 for illustrative purposes, public network 16 generally includes a collection of interconnected network devices, such as network servers, routers, hubs, switches, workstations, DSLAMs, CMTSes, desktop computers, laptop computers, cellular phones (including so-called "smart" phones), personal digital assistants (PDAs), tablet computers, computer referred to as "netbooks," and any other network device capable of receiving and forwarding network traffic. Usually, public network 16 implements a layer three (L3) protocol referred to as an Internet protocol (IP) by which to route data units referred to as packets. The term "layers" as used in this disclosure refers to layers of the Open Systems Interconnection (OSI) model. In even event, public network 16 is typically referred to as a packet-switched network or a L3 network. While described with respect to packets, the techniques may be implemented with respect to any type of discrete data unit.

Service provider network 16 represents a computer network owned by a service provider that provides access to public network 18 in the form of one or more services, such as a voice over Internet protocol (VoIP) service, a video service sometimes referred to as an Internet Protocol Television (IPTV) service, and a data service often referred to as Internet service. Subscribers contract with the service provider to subscribe to one or more of these services. After subscribing to the service, the subscriber employs one or more of subscriber devices 14 to receive or otherwise access the contracted services. Subscriber devices 14 generally represent one or more of a desktop computer, a laptop computer, a PDA, a cellular phone (including so-called "smart" phones), a netbook, a tablet computer, a set-top box (STB), a cable modem, a digital subscriber line (DSL) modem, a wireless access point (WAP), a server, a hub, a switch, a television, or any other device capable of accessing one or more of the above described services provided by service provider network 18.

In the example of FIG. 1, service provider network 18 includes sub-networks ("subnets") 20A, 20B ("subnets 20") and a backend network 22. Subnets 20 represent a collection of network devices that all share a common subnet address. Devices within the same subnet commonly share addresses from among a designated pool of addresses and have the same IP prefix. An IP prefix is typically denoted using a form of notation referred to as classless inter-domain routing (CIDR) notation that identifies the base address of the network followed by a slash (/) and then a size of the routing prefix. For example, one IP subnet may be identified as 192.168.0.0/16.

Subnets 20 include routers 12 and DSLAMs 24A, 24B ("DSLAMs 24"), respectively, where DSLAM 24A couples to router 12A and DSLAM 24B couples to router 12B. Routers 12 represent one example of a network device that may employ the techniques described in this disclosure. In one example, routers 12 include a routing engine and one or more packet forwarding engines. The routing engine operates as a control plane and implements one or more routing protocols by which to discover the topology of the network in the form of routes from one or more sources addresses to one or more destination addresses. The routing engine maintains these routes in a database referred to as a routing information base (RIB). The routing engine then selects one or more routes and installs so-called "next hops" in a database referred to as a forwarding information base (FIB) of the packet forwarding engine. The packet forwarding engine receives the network traffic, accesses the FIB to select a next hop for each packet of the network traffic, and forwards the packets to their respective network hops. In this way, routers 12 generally route traffic to its intended destination. For example, routers 12 may route packets that conform to the L3 Internet Protocol (IP) and may be referred to as L3 network devices.

DSLAMs 24A, 24B ("DSLAMs 24") couple to subscriber devices 14A-14M and 14N-14Z, respectively. Each of DSLAMs 24 represent access devices that receive network traffic in the form of packets from one or more of their respective subscriber devices 14 and multiplex this network traffic onto one or more connections coupling DLSMS 24 to router 12A in the example of FIG. 1. Commonly, DSLAMs 24 are employed in copper-based networks previously used to couple subscriber devices 14 to a plain old telephone service (POTS) network that provides at least some portion of last-mile access between subscriber devices 14 and DSLAMs 24 via a copper wire lines. In this example, routers 12 each represent a broadband remote access server (BRAS). While described in this context, the techniques may also be employed in cable or optical networks providing last-mile access using cable or optical fiber lines.

Backend network 22 represents a computer network that provides administrative and other functions necessary to authenticate and otherwise provide the various services offered by service provider network 18. Backend network 22 includes a remote authentication dial-in user service (RA- DIUS) server 26. RADIUS server 26 generally implements a RADIUS protocol. While shown as a separate device, one or more of routers 12 may incorporate the functionality attributed to RADIUS server 26 in the form of a RADIUS module. In any event, the RADIUS protocol provides one form of authentication, authorization and accounting (AAA) management. RADIUS server 26 represents a network device that provides centralized AAA management that authenticates, authorizes subscriber devices 14 so that these devices 14 can gain access to only those services to which the respective subscriber has contracted. RADIUS server 26 also provides accounting in the event one or more of the services to which the subscriber has contracted is payable on a use-basis, such as pay-per-view (PPV) services. While shown in backend network 22, RADIUS server 26 may be located in a more central location, such as a central office.

Typically, after subscribing to one or more services, as noted above, the subscriber directs one or more of subscriber devices 14 to accesses the services to which the subscriber has contracted with the service provider to provide. Commonly, in a copper-based network, the subscriber installs a subscriber device referred to as a digital subscriber line (DSL) modem, which subscriber device 14A, for purposes of illustration, is assumed to represent. This device 14A generally arrives pre-configured from the service provider with the necessary authentication information. Upon coupling subscriber device 14A to DSLAM 22A and powering-on or otherwise activating this device, subscriber device 14A first requests configuration information typically in accordance with a configuration protocol, such as a dynamic host configuration protocol (DHCP).

Requests that comply with DHCP are generally referred to herein as "DHCP requests." More specifically, this DHCP request is denoted as a DHCP discover message in that this first request is broadcast within the local subnet in an attempt to locate DHCP servers residing in the subnet, or a DHCP relay agent that relays the DHCP discover message to a DHCP server located in a different subnet. More information concerning DHCP in general as well as particulars concerning DHCP messages, such as DHCP discover messages, as well as, other messages can be found in Request for Comments (RFC) 2131, titled "Dynamic Host Configuration Protocol," dated March 1997, herein incorporated by reference in its entirety.

A DHCP discover message generally includes a request that one or more IP addresses be allocated for use by subscriber device 14A. Subscriber device 14A, which is representative of a DSL modem in this example, requests these addresses so that it can allocate one of these IP addresses to itself and then assign any remaining addresses to other subscriber devices 14 that couple to subscriber device 14A. Subscriber device 14A broadcasts the DHCP discover message, as noted above, throughout the local subnet, i.e., subnet 20A in this example. DSLAM 22A receives the message and forwards the message to either a local DHCP server or a DHCP relay agent.

In some instances, administrators favor local DHCP servers over a DHCP relay agent that forwards DHCP discover messages to a remote DHCP server located in a different subnet because the local DHCP servers are typically able to respond more quickly than remote DHCP servers due to their proximity to subscriber devices 14. However, this proximity comes at a cost in terms of administrative burden. Consider a large service provider network that includes tens if not hundreds of individual subnets. Deploying local DHCP servers in each subnet requires that tens if not hundreds of DHCP servers need to be properly configured so that each DHCP server allocates IP addresses from a different subset of the IP address space reserved for use by the service provider network. If two or more subsets overlap, the local DHCP servers may allocate the same IP address for use by two different subscriber devices, which can cause considerable confusion when devices, such as routers 12, attempt to resolve the IP address to a single subscriber device. Consequently, local DHCP servers are generally prone to misconfiguration that can lead to significant routing errors with respect to routers and loss of service with respect to subscriber devices.

Moreover, local DHCP servers may waste a portion of the subset of the IP address space assigned to each of the local DHCP servers for allocation to the subscriber devices. To illustrate, a typical contract for data services provided by a service provider stipulates that a subscriber can access the data service with a set number of subscriber devices, each of which requires a different IP address. Consequently, when provisioning subscribers, the administrator configures the DHCP server to allocate the set number of IP addresses defined in the data service contract for each subscriber that resides within a given subnet, whether or not the subscriber actually employs the set number of subscriber devices to access the data service. Thus, the subset of the IP address space assigned to the local DHCP servers represents a maximum number of IP addresses that arises due to the presumption that each subscriber employs the set number of subscriber devices to access the data service. When the subscribers use less than the set number of subscriber devices, the local DHCP server only allocates a portion of this maximum number of IP addresses. As a result, the remaining IP address are reserved for use only by the local DHCP servers, but never actually allocated by the DHCP servers, thereby wasting potentially valuable, especially in the limited address space of IP version 4 (IPv4), IP addresses that could be used by other DHCP servers.

To avoid both the administrative burden and the waste of potentially valuable IP addresses, administrators, in some instances, implement one or more centrally located DHCP server that are remote from subnets 20. In each subnet, such as subnets 20, the administrator deploys a DHCP relay agent that directs DHCP discover messages to one or more centrally located DHCP servers. Because the DHCP servers are centrally located, the administrator may more efficiently administer the DHCP servers. Moreover, fewer DCHP servers need be deployed because a centrally located DHCP server may service a number of subnets contrary to local DHCP servers that generally only service a single subnet or, at most, a few proximately located subnets. As there are generally less central DHCP servers to administer and each DHCP server manages a larger set of IP addresses, these DHCP servers are not as prone to configuration errors involving overlapping assignment of sets of IP addresses.

Additionally, the centrally located DHCP servers generally do not waste as many IP addresses as those wasted by local DHCP servers due to the fact that the centrally located DHCP servers may receive requests from a large number of subnets and may be more easily administered. To illustrate consider that the service provider may specify the set number of devices, but acknowledge that most subscribers will not employ concurrently the set number of devices. In the small IP address subsets employed with respect to local DHCP servers, it is important to allocate the maximum because under allocation of IP address subset would require burdensome reconfiguration. In a centrally located DHCP server, administration is less of an issue so under allocation of IP address subsets may be more easily tolerated. Moreover, the service provider may determine an average use per subscriber of IP addresses and allocate this average number of IP addresses per subscriber given that the allocated IP address subset is larger in a centrally located DHCP error and therefore provides more room for error as opposed to the relatively small IP address subsets of local DHCP servers. Thus, while the centrally located DHCP servers may not respond as quickly to DHCP messages compared to local DHCP servers, the centrally located DHCP servers are more easily administered and do not generally waste as many IP addresses, again, in comparison to local DHCP servers.

In accordance with the techniques described in this disclosure, routers 12 include shared pool managers 28A, 28B ("shared pool managers 28") that enable routers 12 to implement local DHCP servers 30A, 30B ("local DHCP servers 30") in a manner that reduces, if not potentially eliminates, both the administrative burdens and IP address waste commonly associated with local DHCP servers 30. In one example, each of shared pool managers 28 represent a hardware module, which in some instances executes software, to manage a virtual global address pool in accordance with the techniques described in this disclosure. Each of local DHCP servers 30 may represent a hardware module, which in some instances executes software, to implement DHCP in accordance with the above incorporated reference, as one example.

Reference to a hardware module in this disclosure with respect to individual modules should not be construed to suggest that each of these modules are necessarily implemented by separate, distinct or individual hardware modules. Rather, each of these modules may be executed by the same hardware module, such as a control unit described below with respect to the example of FIG. 2. Consequently, the techniques should not be limited in this respect such that each module is necessarily implemented by a separate, distinct or individual hardware module.

The term "pool" is used in this disclosure to refer to the subset of the IP address space assigned for use by a given local DHCP server, where the term "assign" refers to reservation of a block or subset of addresses by a given local DHCP server in contrast to the term "allocate," which refers to allocation of one or more addresses from the assigned subset of addresses to subscriber devices by the local DHPC server. The term "global address pool" refers generally to a subset of the IP address space reserved for use by two or more local DHCP servers. This global address pool is "virtual" in the sense that shared pool managers 28 facilitate access by local DHCP servers 30 to the global address pool but that this global address pool is not ever assigned in its entirety to any single one of local DHCP servers 30. In other words, all of the local DHCP servers 30 can access the global address pool to reserve different portions of this address pool for use by DHCP servers 30 but none of the local DHCP servers 30 are actually assigned the entire global address pool. The global address pool, from the perspective of DHCP servers 30, appears as if it has been assigned to the DHCP server in its entirety when in fact it is shared by local DHCP servers 30.

Initially, shared pool managers 28 are configured to share a given global address pool, which again can be either a subset of the IP address space assigned to service provider network 18 or the entire IP address space assigned to service provider network 18. In any event, shared pool managers 28 each stores data that defines the global address space shared by both of local DHCP servers 30 of routers 12. This address space is shared in that both maintain the same address space, meaning that this space overlaps and initially spans the entire address pool. Each of shared pool managers 28 then attempt to reserve a block of the global address space for each of respective local DHCP servers 30. For example, shared pool manager 28A may generate a request that requests a block of addresses within the global address space be reserved for use by local DHCP server 30A in allocating addresses from the reserved block to one or more of subscriber devices 14A-14M coupled to router 12A. Shared pool manager 28B may likewise generate a similar request to that of the request generated by shared pool manager 28A requesting a block of addresses within the global address space be reserved for use by local DHCP server 30B in allocating addresses from the reserved block to one or more of subscriber devices 14N-14Z coupled to router 12B. Each of these requests generally includes a bitmap having one bit for each of the addresses in the global address space. A bit set to one in the bitmap indicates a request for the corresponding address. In one example, the block of addresses defined by each request need not be a contiguous block of addresses but may be any combination of addresses within the global address space.

Shared pool managers 28 then broadcast their requests to every other one of shared pool managers 28 that share the same global address space, whereupon shared pool managers 28 extract the bitmap and determine whether the request presents any address conflicts. An address conflict occurs when the bitmap indicates an attempt to reserve an address previously reserved or attempted to be reserved contemporaneously to the received request by shared pool managers 28 that received the request. That is, both of shared pool managers 28 may in some instances attempt to reserve the same address contemporaneously, which results in an address conflict. Shared pool managers 28, in response to an address conflict, reject the respectively received requests and select a different block of addresses using a random offset or some other method to avoid repeated address conflicts. If shared pool managers 28 do not detect an address conflict, shared pool managers 28 transmit a response indicating that the request has been granted.

In this respect, shared pool managers 28 receive a response from each of the another shared pool managers 28 that share the same global address space indicating whether the requested block of addresses is available for use by the requesting one of shared pool managers 28 (and thus by local DHCP server 30A) in allocating addresses from the reserved block to subscriber devices 14. Based on the indication in the response received from the other shared pool managers 28, each of shared pool managers 28 update the data that defines the global address space to reflect that the block of addresses has been reserved for use by the first network device. As noted above, in the instance of an address conflict, this request process is repeated until a block of addresses is reserved for use by local DHCP server 30A.

After configuring shared pool manager 28, the administrator often does not need to further interact with shared pool managers 28, as shared pool managers 28 automatically (that is, without administrator input) negotiate and reserve blocks of the global address space and configure local DHCP servers 30 with the reserved blocks. Shared pool managers 28 therefore reduce administrative burden normally associated with administrating local DHCP servers 30 while also reducing resource waste as smaller blocks of a size less than the maximum may be reserved. If additional addresses are required, as illustrated in the example below, shared pool managers 28 may repeat the above processes to reserve another block of the global address space and configure local DHCP servers 30 to use the previously reserved block in conjunction with the additional block. Again, shared pool managers 28 generally reserve this additional block without any administrative oversight or input, thereby lessening if not eliminating administrative burdens normally associated with local DHCP servers 30.

For example, assuming shared pool managers 28 have reserved a block of the global address pool for use by each of local DHCP servers 30, each of local DHCP servers 30 begin receiving DHCP discover messages from one or more of subscriber devices 14. Local DHCP servers 30 respond to these discover messages with DHCP offer messages. The DHCP offer messages define a lease for one or more of the IP addresses of the block of the global address pool reserved for each of local DHCP servers 30. Those of subscriber devices 14 that initially sent the DHCP discover messages respond to the DHCP offer messages with a DHCP request message requesting the lease offered in one of the DHCP offer messages. Local DHCP servers 30 respond to this offer messages with a DHCP acknowledgement (ACK) message that indicates acknowledgement of the lease for the IP address by the respective ones of subscriber devices 14 requesting an IP address. Generally, each of shared pool managers 28 stores data indicating those of the IP addresses within the block of the global address pool reserved for use by local DHCP servers 30 that have been allocated to subscriber devices 14.

Shared pool managers 28 may intercept (in a manner transparent to local DHCP servers 30) DHCP discover messages and determine whether any of the block of IP addresses reserved from the global address pool are available for use by the requesting one of subscriber devices 14. If, based on the data stored by shared pool manager 28 indicating those of the IP addresses available for allocation by local DHCP servers 30, shared pool manager 28 determines that none of the IP addresses are available in the reserved block, shared pool managers 28 negotiate in the manner described above an additional block of IP addresses from the global address pool that can be reserved for use by local DHPC servers 30. Shared pool managers 28, after negotiating this additional block, configures local DHCP servers 30, respectively, with the additional block of addresses reserved from the global address pool. Shared pool manager 28 typically drops or does not responds to the received DHCP discover message that prompted the reconfiguration of local DHCP servers 30, whereupon the one of subscriber devices 14 that issued this DHCP discover message typically times out after a set period of time and resends the DHCP discover message. Shared pool managers 30 verify that local DHCP server 30 has IP addresses available for allocation and forwards the DHCP discover message to the respective one of local DHCP servers 30. Local DHCP servers 30 responds to this DHCP discover message in the manner indicated above so as to eventually allocate an IP address from the newly reserved block of IP addresses reserved from the global address pool.

In this way, shared pool manager 28 represents a module positioned between subscriber devices 14 and local DHCP server 30 that transparently intercepts DHCP messages to provide a form of automated administrative oversight. When shared pool managers 28 detects that the respective one of local DHCP servers 30 no longer has any addresses available for allocation, shared pool managers 28 automatically reconfigures local DHCP servers 30 to expand the number of IP addresses that can be allocated. Likewise, shared pool managers 28 may detect unused IP addresses and dynamically reconfigure local DHCP servers 30 to reduce the number of IP addresses that can be allocated by respective ones of local DHCP servers 30. Consequently, by providing this automated administrative oversight, shared pool managers 28 may enable local DHCP servers 30 such that these local DHCP servers 30 require little if any additional administrative oversight in comparison to a central DHCP server while also reducing address waste normally associated with local DHCP servers.

It is noted that subnets 20 shown in FIG. 1 are separate from one another despite these two subnets 20 potentially sharing addresses from the same global address pool. That is, the term "subnet" usually refers to a computer network where each of the devices of the network is assigned an address that shares the same IP prefix. As a result of the techniques described in this disclosure, it is possible shared pool manager 28A reserves a non-contiguous block of IP addresses having one or more addresses identified by an IP prefix of one or more addresses reserved by shared pool manager 28B for use by local DHCP server 30B, thereby effectively creating one large subnet in which both routers 12 reside contrary to the example of FIG. 1. It is also possible that shared pool managers 28 each reserve contiguous blocks of addresses that each includes all of the addresses for a given IP prefix. In this alternative contiguous block instance, subnets 20 represent typical subnets rather than forming one large subnet. For this reason, subnets 20 are shown as dashed lines in FIG. 1 to denote that these subnets 20 may effectively merge or remain distinct depending on the configuration of shared pool managers 28.

Figure 2:
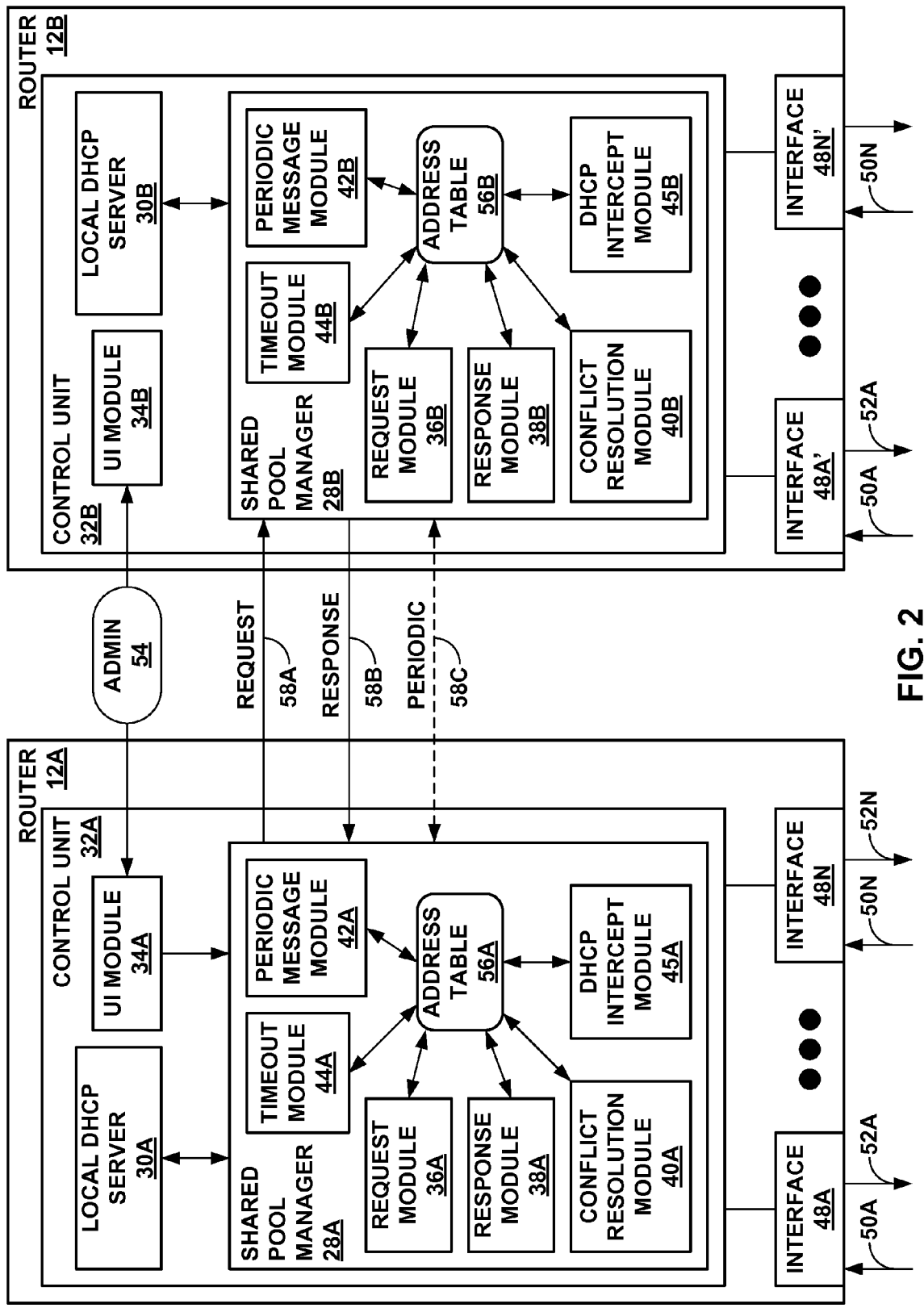
FIG. 2 is a block diagram illustrating routers of FIG. 1 in more detail.

FIG. 2 is a block diagram illustrating routers 12 of FIG. 1 in more detail. Again, while described with respect to particular network devices, i.e., routers 12, in this example, the techniques described in this disclosure may be implemented by any type of network device capable of implementing a local DHCP server. In general, the techniques should not be limited strictly to the examples described in this disclosure.

As shown in the example of FIG. 2, router 12A includes a control unit 32A. Control unit 32A may comprise one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 32A may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 32A may be divided into two logical or physical "planes" to include a first control or routing plane and a second data or forwarding plane. That is, control unit 32A may implement two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality. For purposes of illustration, these planes are not shown in the example of FIG. 2, however, generally the control or routing plane of control unit 32A implements local DHCP server 30A and shared pool manager 28A.

Control unit 32A includes shared pool manager 28A, local DHCP server 30A and user interface (UI) module 34A. Shared pool manager 28A includes a request module 36A, a response module 38A, a conflict resolution module 40A, a periodic message module 42A, a timeout module 44A. Request module 36A represents a hardware module, which in some instances executes software, to generate block requests requesting a block of either contiguous or non-contiguous IP addresses from the global address pool. Response module 38A represents a hardware module, which in some instances executes software, to generate responses to received block requests. Conflict resolution module 40A represents a hardware module, which in some instances executes software, to resolve address conflicts that result when a received response indicates that one or more addresses of the requested block are unavailable. Periodic message module 42A represents a hardware module, which in some instances executes software, to generate periodic messages indicating the addresses reserved for use by local DHCP server 30A. Timeout module 44A represents a hardware module, which in some instances executes software, to determine when one or more leases of IP addresses have timeout and therefore become available for consideration as an unreserved IP addresses, i.e., an address not reserved for use by any of local DHCP servers 30 that share the global address pool.

Local DHCP server 30A, as noted above, represents a hardware module, which in some instances executes software, to implement DHCP. UI module 34A represents a hardware module, which in some instances executes software, to provide a user interface with which a user may interface to interact with local DHCP server 30A and shared pool manager 28A of control unit 12A. UI module 34A may provide a graphical user interface (GUI) or a command line interface (CLI) with which a user may interface to input commands, scripts, and configuration data.

As further shown in FIG. 2, router 12A includes interfaces 48A-48N ("interfaces 48") that receive and send packet flows or network traffic via inbound network links 50A-50N ("inbound network links 50") and outbound network links 52A-52N ("outbound network links 52"), respectively. IFCs 48 are typically coupled to network links 50, 52 via a number of interface ports (not shown), and forward and receive packets and control information from control unit 37 via a respective one of paths 54A-54N ("paths 54"). Each physical interface of IFCs 48 is typically assigned a unique identifier by control unit 37, and multiple logical interfaces having unique identifiers may be assigned to each physical interface, where each logical interface represents as a distinct input or output interface for different network traffic. These logical interfaces may represent VLANs and each VLAN may be assigned a unique VLAN tag. Often, each particular context in which a DHCP client devices resides is assigned a VLAN tag to differentiate between client devices of different context. Each of IFCs 48 may also each couple to a different separate sub-network via links 50, 52. These sub-networks, although not shown in FIGS. 1 and 2, may comprise a Large Area Network (LAN) or other broadcast network.

Router 12A may include a chassis (not shown in FIG. 2) having a number of slots for receiving a set of cards, including IFCs that include one or more of interfaces 48. Each card may be inserted into a corresponding slot of a chassis for communicably coupling the card to a control unit 32A via a bus, backplane, or other electrical communication mechanism.

Router 12B is substantially similar to router 12A in that router 12B includes a control unit 32B and interfaces 48A'-48N' ("interfaces 48'") that are substantially similar to control unit 32A and interfaces 48 of router 12A. Moreover, shared pool manager 28B of control unit 32B includes modules 36B-44B that are substantially similar to respective modules 36A-44A of shared pool manager 28A included within control unit 32A of router 12A. UI module 34B and local DHCP server 30B may also be substantially to UI module 34A and local DHCP server 30A.

Initially, a user, such as administrator 54 ("admin 54"), interfaces with a user interface presented by UI modules 34A, 34B ("UI modules 34") to enter configuration data for configuring shared pool managers 28. This configuration data defines at least the size of the global address pool. Shared pool managers 28 then store data defining address tables 56A, 56B ("address tables 56"), respectively, that contains an entry for each address of the global address pool defined by the configuration data. An example representative of a newly initialized address tables 56 is shown below with respect to the following Table 1.

TABLE 1

| Pool Members | L | C | T | O |
|---|---|---|---|---|
| 192.168.2.1 | 0 | 0 | Null | Null |
| 192.168.2.2 | 0 | 0 | Null | Null |
| 192.168.2.255 | 0 | 0 | Null | Null |

In the above Table 1, each row after the header row (i.e., the first row in the example of Table 1) denotes an entry in address tables 56 that defines a "Pool Member" or a different address of the global address pool, an "L" bit indicating whether the corresponding address is "owned" or reserved by respective the one of shared pool managers 28 that maintains the respective one of address tables 56, a "C" bit indicating whether the respective "owned" or reserved addresses are actually consumed, a "T" or timestamp indicating a time at which the corresponding address lease was last refreshed, and an "O" or owner indicating who sent the last request for the corresponding address.

After being configured in this matter and initializing address tables 56, each of request modules 36 of shared pool managers 28 access the respective one of address tables 56 and select a contiguous or non-contiguous block of addresses that are not currently reserved by shared pool managers 28. That is, each of request modules 36 evaluates the respective data that defines the network address pool to determine a block of addresses identified by the data that defines the network address pool that is not currently reserved for use by the other local DHCP server in allocating addresses from the identified particular block of addresses to the one or more subscriber devices coupled to the second network device. In one example, request modules 36 may select addresses reserved by another shared pool manager 28 but that have since timeout as determined from the corresponding timestamp. To illustrate, request module 36A, generally, attempts to select a contiguous block of addresses first, and only selects non-contiguous blocks of addresses if a contiguous block of addresses of a configured size is not available as determined through analysis of address table 56A. In any event, request module 36A generates a bitmap having a bit for each address of the global address pool. Request module 36A indicates those addresses of the global address pool that it has determined to request by setting each of the corresponding bits in the bitmask to one and setting the remaining bits of the bitmask to zero. Request module 36A also updates address table 56A, and specifically, the "L" bits for those addresses request module 36A has requested for use by local DHCP server 30A. Request module 36 generates a request message 58A to include this request and forwards this request via an appropriate one of interfaces 48 to each of the other shared pool managers 28, i.e., shared pool manager 28B in the example of FIG. 2.

Response module 38B of shared pool manager 28B receives this request message 58A and extracts the bitmap defined by this message 58A. Response module 38B then compares this received bitmap (which is sometimes referred to as a "request" bitmap) to address table 56A. For example, response module 38B may perform a logical "AND" operation (usually denoted in programming languages using a double ampersand "&&") between the request bitmap and the "L" column of address table 56A. The bitmap resulting from this logical AND operation may be referred to as a "response" bitmap. Response module 38B generates a response message 58B to include this response bitmap and forwards response message 58B via one of interfaces 48' to shared pool manager 28A.

Response module 38A of shared pool manager 28A receives response message 58B and extracts the response bitmap. Response module 38A analyzes the response bitmap to determine whether there are any address conflicts. Response bitmap generally indicates an address conflict with a bit of the bitmap set to one. That is, the logical "AND" operation performed by request module 36B reveals address conflicts in that a logical AND of a one in a location of the request bitmap as a corresponding one in the same location of the "L" bitmap indicates that the requested address is currently reserved for use by local DHCP server 30B. Consequently, any bits of the response bitmap set to one indicates an address conflict, while if all of the bits of the request bitmap are set to zero, the bitmap indicates acknowledgement of the request.

After performing the local "AND" operation, request module 36B analyzes the response bitmap to determine whether any address conflicts occurred. If no address conflicts are detected, i.e., every bit of the request bitmap is set to zero in this example, request module 36B updates address table 56B to indicate the requested addresses are owned by shared pool manager 28A and sets the corresponding timestamp to the current time. If an address conflict is detected, request module 36B does not update address table 56A. To illustrate with respect to the above example of Table 1, consider that shared pool manager 28A requests the first two addresses shown in Table 1 and request module 36B performed the logical "AND" operation and determined that no address conflicts occurred. Request module 36B updates the first two entries after the header entry of Table 1 to denote the current time for the timestamp column and the owner as "A," which is assumed for purposes of illustration to denote shared pool manager 28A. The following Table 2 shows the result of this update.

TABLE 2

| Pool Members | L | C | T | O |
|---|---|---|---|---|
| 192.168.2.1 | 0 | 0 | $T_X$ | A |
| 192.168.2.2 | 0 | 0 | $T_X$ | A |
| 192.168.2.255 | 0 | 0 | Null | Null |

Referring to Table 2 above, the timestamp column has been updated in Table 2 for the first two entries to denote the current time, $T_X$, and that shared pool manager 28A has reserved the two corresponding addresses.

Shared pool manager 28A may receive and process multiple responses as request 58A is broadcast to all of shared pool managers 28 that have been configured to share the same global address pool. If any one of these responses (which are similar to response 58B) denotes an address conflict, conflict resolution module 40A of shared pool manager 28A is invoked to resolve the conflict. Conflict resolution module 40A analyzes the response bitmap indicating the conflict, refers to address table 56A, updates address table 56A to indicate this conflicted address is reserved by a different one of shared pool managers 28, and generates a request bitmap so as to potentially avoid the detected address conflict. Commonly, the address conflicts result when two or more shared pool managers concurrently, or even in some instances simultaneously, request at least one of the same addresses. Conflict resolution module 40A may implement an algorithm that selects a random time to delay the generation of the request bitmap so as to provide time for the other conflicting one of shared pool managers 28 to generate a request to reserve the conflicted address. This algorithm generally also randomly selects another address that is usually not adjacent to the requested address. This randomness helps prevent further conflicts from occurring.

Assuming for illustrative purposes that no address conflicts are detected, request module 36A updates address table 56A to reflect that shared pool manager 28A has reserved the first two addresses (continuing the example from above) at the current time, $T_Y$. The following Table 3 illustrates address table 56A after this update.

TABLE 3

| Pool Members | L | C | T | O |
|---|---|---|---|---|
| 192.168.2.1 | 1 | 0 | $T_Y$ | A |
| 192.168.2.2 | 1 | 0 | $T_Y$ | A |
| 192.168.2.255 | 0 | 0 | Null | Null |

As shown in the above Table 3, request module 36A updates the "L" column of the first and second entries to store a bit value of one, the timestamp column of the first and second entries to denote the current time, $T_Y$, and the "O" column to denote that shared pool manager 28A or "A" owns or has reserved these addresses. In one example, request module 36A leaves the "C" bits for these entries unedited as these addresses have not been allocated by local DHCP server 30A.

Although not shown in the example of FIG. 2, shared pool manager 28B also performs a substantially similar process to that of shared pool manager 28B to reserve a block of addresses. For purposes of illustration it is assumed that shared pool manager 28B reserves the last two addresses in the global address pool reflected in Tables 1-3 above. The following Table 4 shows the state of address table 56B after reserving these two addresses.

TABLE 4

| Pool Members | L | C | T | O |
|---|---|---|---|---|
| 192.168.2.1 | 0 | 0 | $T_X$ | A |
| 192.168.2.2 | 0 | 0 | $T_X$ | A |
| 192.168.2.254 | 1 | 0 | $T_Z$ | B |
| 192.168.2.255 | 1 | 0 | $T_Z$ | B |

In the example of Table 4, request module 36B has updated the last two entries to denote that shared pool manager 28B, which is denoted by "B" in the "O" column, reserved addresses 192.168.2.254 and 192.168.2.255 at a time of $T_Z$. After reserving these addresses, shared pool managers 28 configure respective local DHCP servers 30 with the reserved addresses.

Meanwhile, periodic message modules 42 each generates a periodic message 58C indicating those addresses of the global address pool owned by respective shared pool managers 28. Each of periodic message modules 42 periodically accesses address table 56, extracts the "L" column bitmap, generates periodic message 58C to include this "L" bitmap and broadcasts periodic message 58C to each of shared pool managers 28 configured to share the same global address pool. Periodic message modules 42 receive these periodic messages 58C from one another and update address table 56A based on "L" bitmap stored to each of these periodic messages 58C. This update is generally performed so as to synchronize address state among various shared pool managers 28, as address table 56A may, as noted above, be updated by the requesting one of shared pool managers 28A before an address conflict is detected. Moreover, a first one of shared pool managers 28 may not detect a conflict and update its respective address table 56 while a second one of shared pool managers 28 may detect a conflict thereby preventing the requesting one of shared pool managers 28 from reserving the addresses indicated by the request bitmap. Yet, this first shared pool manager 28 is not aware of this conflict. Consequently, periodic message modules 42 communicate with one another via periodic messages 58C to synchronize address tables 56 between one another to improve sharing of the global address pool.

Returning to the example discussed above, local DHCP servers 30 may, after being configured with the served address block, begin receiving DHCP discover messages. In some instances, shared pool managers 28 intercept DHCP discover message received via interfaces 48, 48' to determine whether their respective local DHCP servers 30 include sufficient addresses to service the DHCP discover messages. That is, shared pool managers 28 each generally include a DHCP intercept module 45A, 45B ("DHCP intercept modules 45") that intercepts DHCP messages, such as DHCP discovery, offer, request, and ACK messages. In response to DHCP discover messages, DHCP intercept modules 45 accesses the "L" column bitmask and the "C" column bitmask in their respective address tables 56 and determines whether, for each of the bits of the "L" bitmask set to one, whether the corresponding bit of the "C" bitmask is set to zero. If there are sufficient bits in the "L" bitmask that are set to one with the corresponding bits in the "C" bitmask set to zero to accommodate the request for one or more addresses set out in the DHCP discover message, DHCP intercept modules 45 forwards the DHCP discover messages to their corresponding local DHCP server 30. If, however, there are not sufficient bits to accommodate the request in the DHCP discover module, DHCP intercept module 45 invokes request module 36A to request that another block of addresses of the global address pool be reserved for use by their respective one of local DHCP servers 30, which proceeds in the manner described above.

DHCP intercept modules 45 also intercept DHCP ACK messages, parse the address allocation from the ACK message, and update their respective one of address tables 56 to denote consumption by requesting subscriber devices 14 of the addresses reserved for use by their respective one of local DHCP servers 30. For example, DHCP intercept module 45A may intercept a DHCP ACK message for the address listed in the first entry of the above Table 3. DHCP intercept module 45A parses this DHCP ACK message to retrieve the address, i.e., 192.168.2.1 in this example, and accesses address table 56A to update the "C" bit for the first entry to denote that this address has been consumed. The following Table 5 illustrates the result of this update on Table 3 and also notes the reservation of the last two addresses in the global address pool by shared pool manager 28B (which was described with respect to Table 4 above).

TABLE 5

| Pool Members | L | C | T | O |
|---|---|---|---|---|
| 192.168.2.1 | 1 | 1 | $T_Y$ | A |
| 192.168.2.2 | 1 | 0 | $T_Y$ | A |
| 192.168.2.254 | | | $T_A$ | B |
| 192.168.2.255 | 0 | 0 | $T_A$ | B |

While all of this negotiation is ongoing to reserve blocks and maintain an accurate address state of the global address pool, timeout modules 44 routinely access their respective address tables 56 to determine if one or more address leases have timed out. That is, the configuration data input by admin 54 may define a lease timeout value that defines a duration that a given shared pool manager 28 may reserve a given address. Timeout modules 44 access their respective one of addresses tables 56 to retrieve the timestamp values for all entries having an "L" bit set to one. Timeout modules 44 then compare the retrieved timestamps to the current time to determine an elapsed time for each owned address. Timeout modules 44 next compare the elapsed times to the timeout value. If one or more of the elapsed times exceed the timeout value, timeout modules 44 clear that address from address tables 56 by setting the respective "L" and "C" bits back to zero and the timestamp and owner fields to null. Generally, when shared pool managers 28 configures their respective local DHCP servers 30 with the reserved block of addresses, shared pool managers 28 set the lease duration to a value that is a multiple of the lease timeout value. In this way, local DHCP servers 30 automatically revoke the subscribers lease for the address at a point in time before timeout modules 44 perform their timeout operations described above to clear entries in their respective one of address tables 56. In this way, local DHCP servers 30 do not allow leases to run longer than shared pool managers 28 is allowed to reserve a given address from the global address pool.

In some instances, DHCP intercept modules 45 refresh the timestamp in response to DHCP ACK messages so that when timeout modules 44 determine elapsed times, these elapsed times better reflect lease duration configured by local DHCP servers 30. That is, local DHCP servers 30 can be configured to provide lease durations up to the lease timeout value configured for timeout modules 44. DHCP intercept module 45A, for example, updates the timestamps for entries of the address table 56A in response to DHCP ACK messages for those corresponding addresses. Timeout module 44A then determines elapsed times for these entries that reflect an elapsed time that a given subscriber device has reserved the use of that address, rather than an elapsed time shared pool manager 28A has reserved the address. In comparing the timeout value to this elapsed time, timeout module 44A in effect determines when local DHCP server 30A will revoke the lease, thereby synchronizing timeout module 44A with local DHCP server 30A. DHCP intercept module 45A may continually update these timestamps in response to DHCP renew messages that request renewal of a given lease. In either instance, when timeout module 44A detects a timeout in these instances and clears a given entry, timeout module 44A often also reconfigures local DHCP server 30A so that it can no longer use these addresses.

The techniques described above with respect to routers 12 may enable a dynamic global address pool such that one or more network devices that each implement a local DHCP server may dynamically join and leave the global address pool. To illustrate, consider that router 12A may already have joined the global address pool in the manner described above but router 12B may not yet have joined the global address pool. Admin 54 interfaces with a user interface presented by UI module 34B executing within control unit 32B of router 12B to input configuration data. This configuration data includes, as noted above, various data to enable shared pool manager 28B to dynamically join the shared global address pool. This configuration data, for example, may specify the global address pool as an IP subnet address so that shared pool manager 28B can configure address table 56B to reflect this shared global address pool. Once configured in this manner, shared pool manager 28B begins issuing requests to reserve a block of addresses for use by local DHCP server 30B in the manner described above with respect to shared pool manager 28A of router 12A.

In this manner, once configured, admin 54 is not required to perform any other administrative actions to otherwise configure local DHCP server 30B. Instead, shared pool manager 28B automatically (that is, without direct administrative action in this example) reserves a block of addresses from the global address pool and configured local DHCP server 30B with the block of addresses. The techniques therefore facilitate dynamic addition of new routers with only minor initial administrative oversight to configure the new routers to provide a local DHCP server. In this way, the techniques may accommodate the dynamic addition of local DHCP servers to service growth in the aggregation network of additional subscriber devices.

Figure 3A:
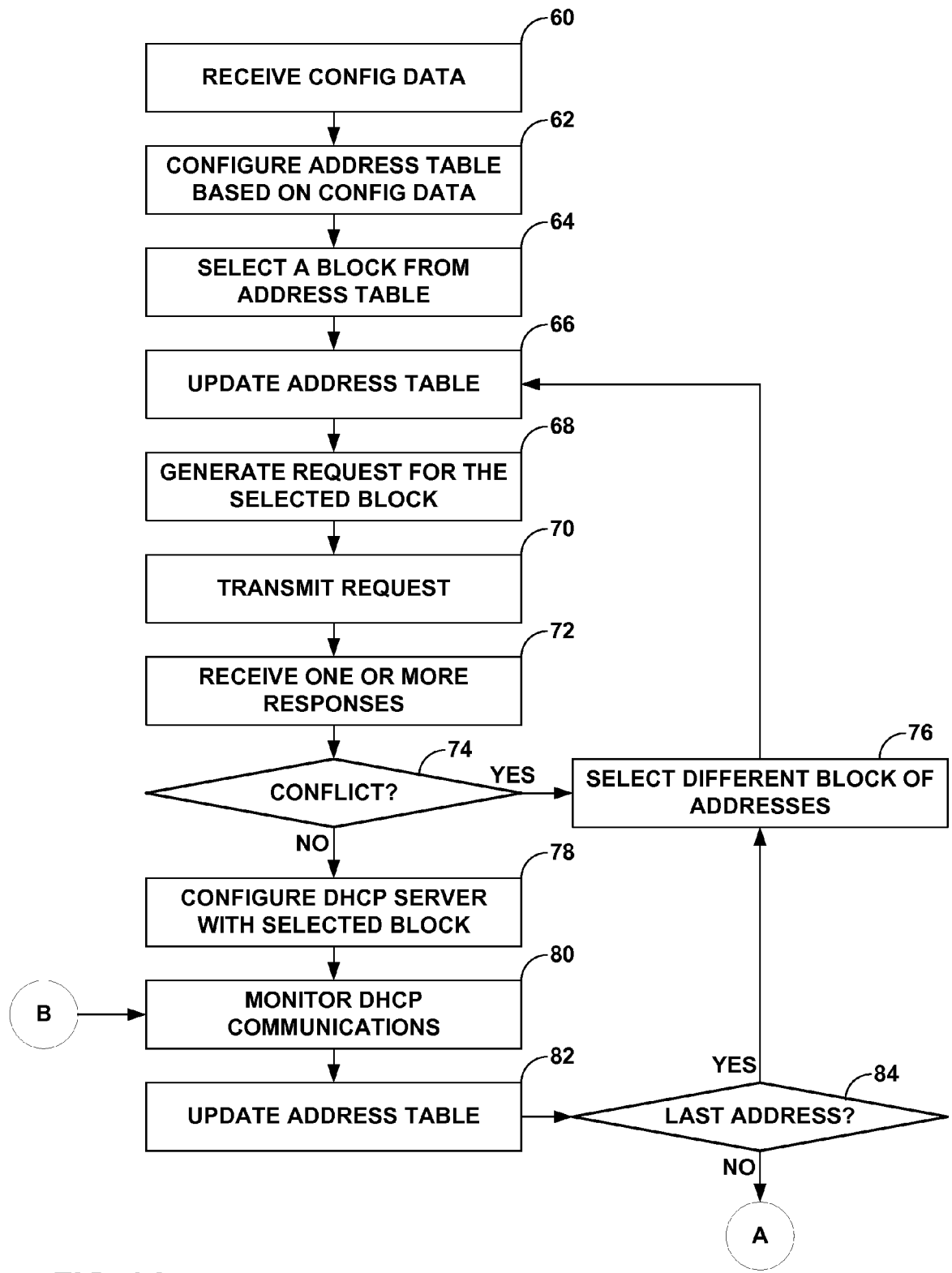
FIGS. 3A, 3B are flowcharts illustrating example operation of a network device in implementing the techniques described in this disclosure.
Figure 3B:
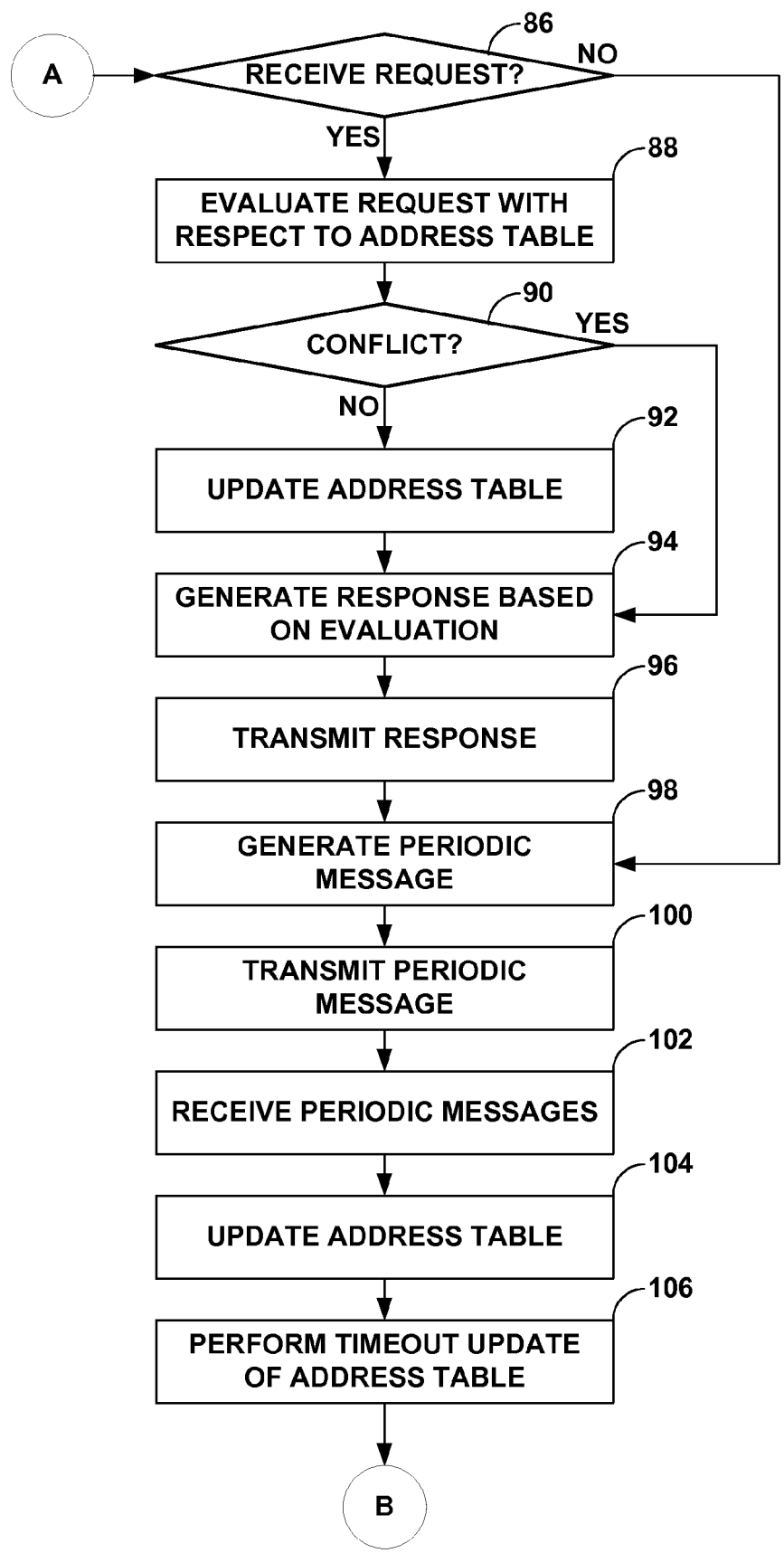

FIGS. 3A, 3B are flowcharts illustrating example operation of a network device, such as router 12A shown in the example of FIG. 2, in implementing the techniques described in this disclosure. While described with respect to a particular network device, i.e., router 12A in this example, the techniques may be implemented by any network device as noted above. The techniques should not be limited in this respect.

Referring first to FIG. 3A, a user, such as admin 54 initially interacts with a user interface presented by UI module 34A to input configuration data, as described above (60). The configuration data typically defines parameters for configuring a global address pool within address table 56A, as well as, other parameters, such as a frequency with which periodic message module 42A generates and sends a periodic message 58C and a timeout value that controls how long a given one of shared pool managers 28A can reserve a given block of addresses. In general, the configuration data represents any data that facilitates configuring shared pool manager 28A to implement the techniques described in this disclosure. UI module 34A forwards this configuration data to shared pool manager 28A of control unit 32A, which configures address table 56A in the manner described above and possibly periodic message module 42A and timeout module 44A (62).

After configuring address table 56A, shared pool manager 28A invokes request module 36A to select a block of addresses from address table 56A (64). Request module 36A updates address table 56A to denote that these addresses are reserved by shared pool manager 28A, as described above (66). The configuration data may define a maximum block size and request module 36A generally selects a block of addresses that meets this maximum block size. In any event, request module 36A generates a request 58A for the selected block of address in the manner described above (68). Usually, this request 58A includes a bitmap having a bit for each of the addresses defined by address table 56A with those of the bits set to one that correspond to the selected block of addresses. Again, this block of addresses may be a contiguous or non-contiguous block of addresses. Request module 36A transmits request 58A to those other devices that share the same global address pool, i.e., router 12B in this example, via one of interfaces 48 (70).

In response to this request 58A, each of those devices that also implement the techniques described in this disclosure and shares the same global address pool, which again is router 12B in this example, evaluates request 58A and responds with a response 58B. Shared pool manager 28A receives this response 58B via one of interfaces 48 (72). Shared pool manager 28A invokes response module 38A to evaluate received response 58B, which determines whether an address conflict has occurred in the manner described above (74). If there is an address conflict, response module 38A forwards response 58B to conflict resolution module 40A. As described above, conflict resolution module 40A then selects a different block of addresses from the global address pool defined by address table 56A so as to avoid the address conflict (76). Conflict resolution module 40A updates address table 56A to remove notations that the previously requested block of addresses was reserved and denote that the different block of addresses will be reserved for use by shared pool manager 28A. Conflict resolution module 40A forwards this different block of addresses to request module 36A, which generates and transmits a new request 58A requesting this different block of addresses (66-70). Once again, shared pool manager 28A receives one or more responses via interfaces 48 and invokes response module 38A to determine whether an address conflict occurred (72, 74).

Assuming that no conflicts occurred ("NO" 74), shared pool manager 28A configures DHCP server 30A to allocate the selected block of addresses in response to DHCP communications, at which point, DHCP server 30A begins receiving DHCP communications (78). DHCP intercept module 45A transparently monitors or intercepts these communications and updates address table 56A, as described above (80, 82). DHCP intercept module 45A, when updating address table 56A, determines whether DHCP server 30A has allocated its last remaining address from the selected block of addresses (84). While described with respect to the "last address," the techniques should not be limited to this specific example. In other instances, DHCP intercept module 45A may determine whether the number of allocated addresses exceeds some limit or threshold. For example, DHCP intercept module 45A may determine whether the percentage of allocated addresses exceeds 90%.

Continuing the above example, if the last address was allocated (or some threshold such as 90% was exceeded), DHCP intercept module 45A invokes request module 36A. Request module 36A select a different block of available addresses (i.e., addresses not denoted as reserved by another one of the shared pool managers that share the same global address pool) from address table 56A, updates address table 56A, generates a request message 58A and transmits request message 58A (76, 64-70). In response to receiving responses 58B to this request, shared pool manager 28A again invokes response module 38A to evaluate the request and determine if a conflict occurred (72, 74). Assuming no conflict, shared pool manager 28A configures DHCP server 30A to expand the block of addresses reserved for use by DHCP server 30A to include the different reserved block of addresses (78).

Assuming further that subsequent DHCP communications do not indicate that the "last address" was allocated ("NO" 84), shared pool manager 28A generally, referring to the example of FIG. 3B, listens for requests similar to request 58A from shared pool manager 28B (86). In response to receiving a request via one of interfaces 48 ("YES" 86), shared pool manager 28A invokes request module 36A, which evaluates the request with respect to address table 56A to determine whether any address conflicts occur between the requested addresses and those currently reserved for use by DHCP server 30A (88, 90). If no conflict results from this evaluation ("NO" 90), request module 36A updates address table 58A to denote that the requested addresses are reserved for use by the requesting shared pool manager, i.e., shared pool manager 28B in this instance (92). Request module 36A forwards the result of the evaluation to response module 38A, which generates and transmits a response similar to response 58B to shared pool manager 28B via one of interface 48 (94, 96). If a conflict does result ("YES" 90), request module 36A, without updating address table 56A, merely forwards the result of the evaluation to response module 38A, which generates and transmits the response based on the evaluation in the manner described above (94, 96).

After sending the response (96) or if no request was received ("NO" 86), shared pool manager 28A periodically invokes periodic message module 42A, which generates and transmits a periodic message 58C via one or more of interfaces 48 in the manner described above (98, 100). Shared pool manager 28A also invokes periodic message module 42A in response to receiving a periodic message 58C, which proceeds to update address table 56A in response to receiving periodic messages 58C (102, 104). Moreover, shared pool manager 28A also routinely or periodically invokes timeout module 44A to update address table 56A and remove any address reservations that have timed out, again as described in more detail above (106). Shared pool manager 28A continues in this manner to intercept DHCP communications, manage reserved addresses and perform the other operations denoted as steps 80-84, 76, and 66-106 until such time as no more addresses in the global address pool are available.

Figure 4:
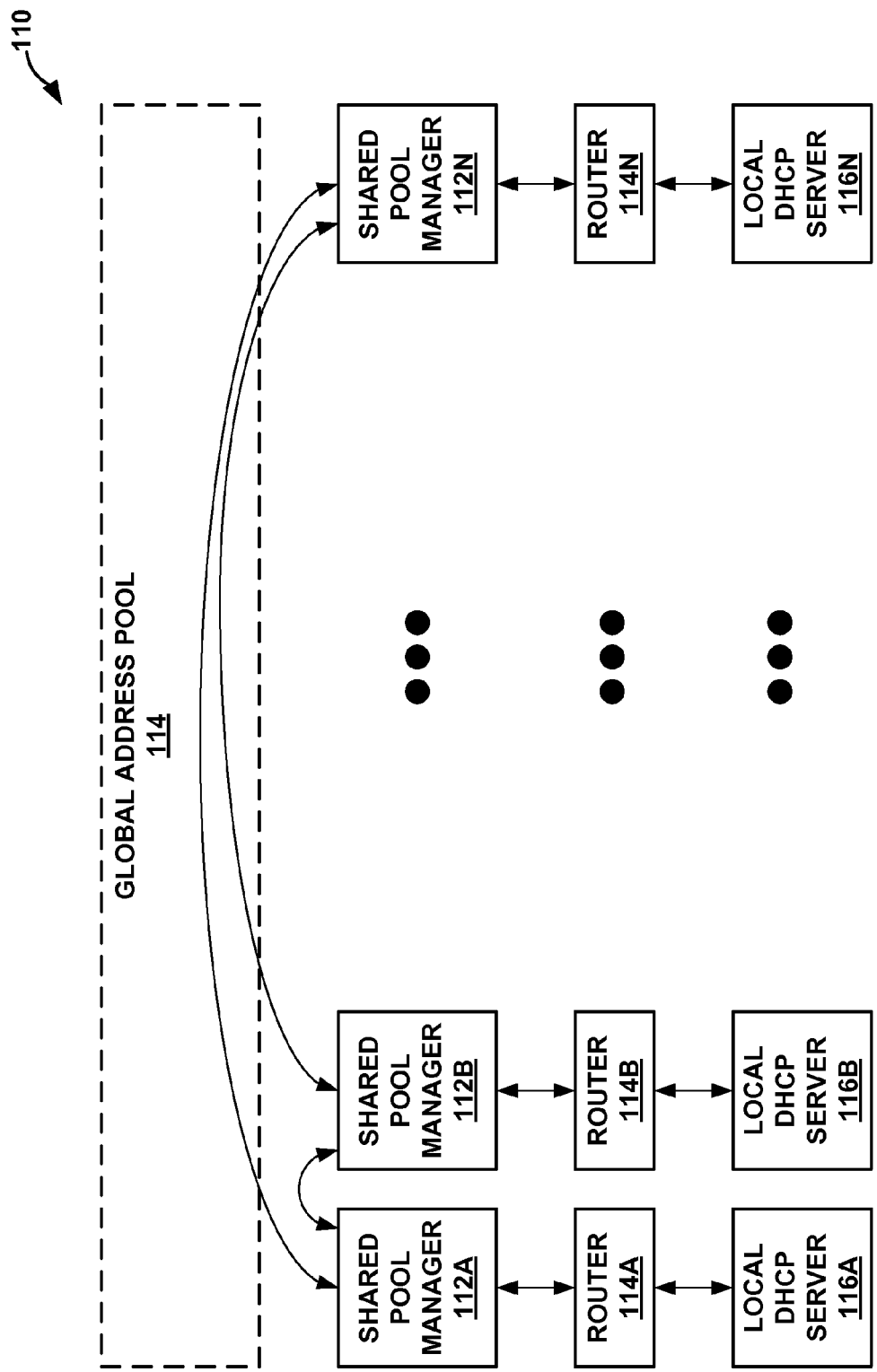
FIG. 4 is a block diagram illustrating a conceptual view of a number of shared pool managers sharing a global address pool in accordance with the techniques described in this disclosure.

FIG. 4 is a block diagram illustrating a conceptual view 110 of a number of shared pool managers 112A-112N sharing a global address pool 114 in accordance with the techniques described in this disclosure. Shared pool managers 112A-112N ("shared pool managers 112") are communicatively coupled to one another and share global address pool 114 through above noted exchange of various types of messages. Share pool managers 112 execute within respective access routers 114, which may represent either physical actual routers or so-called "virtual" routers, that service subscriber devices.

Virtual routers represent a partition of a physical router's resources. This virtualization in effect enables a single router to emulate multiple routers. In some instances, these virtual routers are referred to as separate "routing instances." In any event, each of these virtual routers may execute its own shared pool manager. Often, a single router may implement two virtual routers in a high-availability (HA) context, where one of the virtual routers is designated as a primary virtual router and the other virtual router is designated as a backup or secondary virtual router. If the first virtual router fails for some reason in the HA context, the second backup virtual router may take control of the router and continue routing packets, often without any other router noticing the failure of the first virtual router.

Alternatively, in some instances, multiple physical routers may cooperate with one another to provide a single router. One of these routers is the primary, while another one is the secondary or backup router. In this instance, if the primary one of the cooperating physical routers fails, the secondary one of the cooperating physical routers assumes the operations of the failed one of the cooperating routers. This multiple redundant physical router instance is also referred to generally as a high-availability router.

In any event, to manage this handoff of routing responsibility from the primary to the secondary virtual router or router, the primary router mirrors routing and forwarding information to the secondary router. The techniques described in this disclosure may be implemented in this HA context either with regard to two different physical routers or virtual routers. In either case, the address table may be mirrored from the shared pool manager of the primary virtual router to the shared pool manager of the backup virtual router. In this instance, the backup shared pool manager does not either send or receive messages, but remains silent until activated. Once activated, the backup shared pool manager takes over for the primary shared pool manager.

Routers 114 each include or otherwise communicatively couple to a DHCP server 116. The DHCP communications flow to and from shared pool managers 112 via routers 114, whereupon shared pool managers 112 provide automated administrative oversight of local DHCP servers 116 in the manner described above.

Figure 5A:
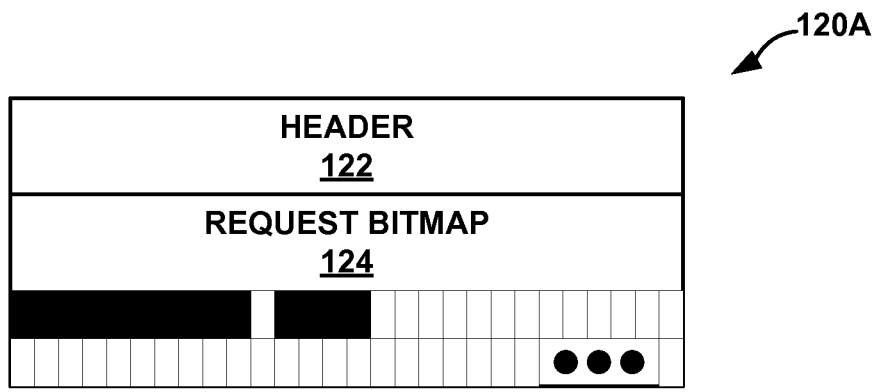
FIGS. 5A, 5B are block diagrams illustrating a request message and a response message in reply to the request message, respectively, that are generated in accordance with the techniques described in this disclosure.
Figure 5B:
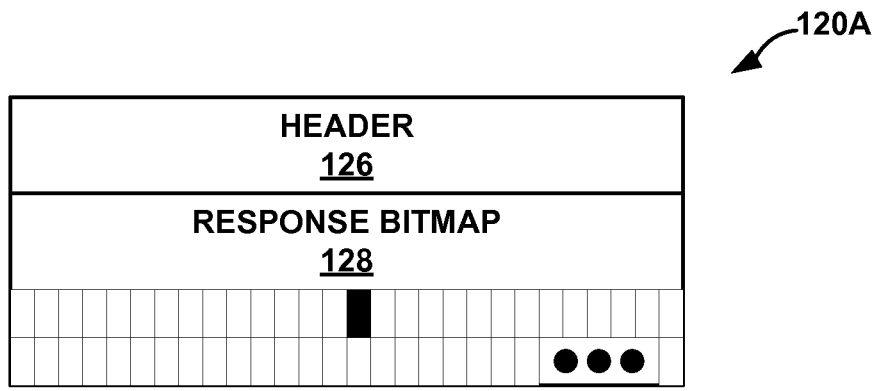

FIGS. 5A, 5B are block diagrams illustrating a request message 120A and a response message 120B in reply to request message 120A, respectively, that are generated in accordance with the techniques described in this disclosure. FIG. 5A is a block diagram illustrating an example request message 120A generated in accordance with the techniques of this disclosure. As shown in the example of FIG. 5A, request message 120A includes a header 122 that identifies a group of one or more shared pool managers that share the same global address pool, such as shared pool managers 112 shown in the example of FIG. 4. Header 122 may define any information necessary to transmit message 120A to shared pool managers 112, as well as, information required to interpret or parse message 120A. Request message 120A also includes a request bitmap 124 that defines a number of bits, with set bits being indicated in the example of FIG. 5A as black-filled blocks. In the example of FIG. 5A, request bitmap 124 defines a request for a block of non-contiguous addresses.

FIG. 5B is a block diagram illustrating an example response message 120B generated in accordance with the techniques of this disclosure. As shown in the example of FIG. 5B, response message 120B includes a header 126 that identifies a group of one or more shared pool managers that share the same global address pool, such as shared pool managers 112 shown in the example of FIG. 4. Header 126 may define any information necessary to transmit message 120B to shared pool managers 112, as well as, information required to interpret or parse message 120B. Response message 120B also includes a response bitmap 128 that defines a number of bits, with set bits being indicated in the example of FIG. 5B as black-filled blocks. In the example of FIG. 5B, response bitmap 128 indicates that one address requested by request bitmap 124 is in conflict, as denoted by the black filled box.

In one example, bitmaps 124 and 128 may be compressed using a number of compression techniques, such as a Lempel-Ziv compression technique, a Lempel-Ziv-Welch compression technique, a PKZIP compression technique, a GZIP compression technique or any other suitable compression techniques. Considering that a common size for a global address pool is 64K, each of bitmaps 124, 128 are about 8 KB of data, which effectively represents the approximate size of each of messages 120A, 120B. Compression using one of these techniques may reduce the size of the bitmaps and therefore the messages to about 2 KB or 3 KB.

In one example, the above techniques may improve DHCP server administration commonly associated with local DHCP servers. Overcoming this administrative burden facilitates the deployment of local DHCP servers, which thereby improves DHCP server response times for the reasons noted above. Quick DHCP response times are typically an important requirement for certain services, such as Voice over IP (VoIP). To illustrate, VoIP employs a process known as a "call setup" that requires a line care or interface of a forwarding engine to set up a VoIP interface for each VoIP call. Often, DHCP communications that precede call setup, when redirected to a remote DHCP server, require the line card to perform additional processing that negatively impacts call setup, decreasing a call setup rate. Using the local DHCP server enabled by the techniques of this disclosure, the additional processing can be avoided, thereby potentially improving the call setup rate.

Various embodiments of the invention have been described. These and other embodiments are within the scope of the following claims.

The invention claimed is:

1. A method for sharing a network address pool comprising:
storing, with a first network device, data that defines 1) the network address pool provided for use in allocation by both the first network device servicing a first sub-network and a second network device servicing a second sub-network different from the first sub-network and 2) individual addresses of the network address pool assigned for use by the first or second network device in allocating the respective individual addresses to one or more subscriber devices coupled to the first or second network device;
evaluating, with the first network device, the data that defines the network address pool to determine a block of addresses identified by the data that defines the network address pool that is not currently assigned for use by the second network device in allocating addresses from the identified particular block of addresses to the one or more subscriber devices coupled to the second network device;
transmitting, with the first network device, a request to the second network device requesting that the determined block of addresses within the network address pool be assigned for use by the first network device in allocating addresses from the requested block to the one or more subscriber devices coupled to the first network device;
receiving, with the first network device, a response from the second network device indicating whether one or more addresses of the requested block of addresses is available to be assigned for use by the first network device in allocating addresses from the requested block to the one or more subscriber devices coupled to the first network device;
updating, with the first network device, the data that defines the network address pool to reflect that the block of addresses has been assigned for use by the first network device based on the indication in the response received from the second network device; and
when the data has been updated to reflect that the block of addresses has been assigned for use by the first network device, allocating, with the first network device, one or more addresses from the assigned block of addresses with the first network device in response to a request by one of the one or more subscriber devices coupled to the first network device for one or more addresses.

2. The method of claim 1,
wherein the first network device includes a router that implements a local dynamic host configuration protocol (DHCP) server,
wherein receiving the response includes receiving a response from the second network device indicating that the requested block of addresses is available to be assigned for use by the first network device in allocating addresses from the reserved block to the one or more subscriber devices coupled to the first network device,
wherein updating the data that defines the network address pool includes updating the data that defines the network address pool to reflect that the block of addresses has been assigned for use by the first network device based on the indication that the requested block of addresses is available to be assigned for use by the first network device, and
wherein the method further comprises automatically configuring the local DHCP server with the requested block of addresses so that the local DHCP server allocates one or more of the addresses from the reserved block to the one or more subscriber devices coupled to the first network device.

3. The method of claim 2, wherein allocating one or more addresses comprises:
receiving a DHCP discover message from one of the subscriber devices coupled to the first network device that requests the one or more addresses;
generating, with the local DHCP server, a DHCP offer message that offers one or more of the addresses from the assigned block to the requesting one of the subscriber devices from which the DHCP discover message was received;
forwarding the DHCP offer message to the requesting one of the subscriber devices;
after forwarding the DHCP offer message, receiving a DHCP request message from the requesting one of the subscriber devices requesting the one or more addresses offered by the DHCP offer message; and
generating and forwarding, with the local DHCP server, a DHCP acknowledgement message acknowledging that the one or more addresses requested by the requesting one of the subscriber devices has been allocated to the subscriber device to use in accessing a computer network.

4. The method of claim 3, further comprising:
monitoring, with the first network device, each of the DHCP discover, offer, request and acknowledgment messages within the first sub-network; and
updating, with the first network device, the data that defines the network address pool to indicate that the address of the assigned block has been consumed by the requesting one of the subscriber devices.

5. The method of claim 4,
wherein the request comprises a first request that requests a first block of addresses,
wherein the response comprises a first response, and
wherein the method further comprises:
evaluating, with the first network device, the data that defines the network address pool to determine an extent to which the addresses of the assigned block have been consumed by the one or more subscriber devices coupled to the first network device;
transmitting, with the first network device, a second request to the second network device requesting that a second block of addresses within the network address pool be assigned for use by the local DHCP server based on the evaluation;

receiving, with the first network device, a second response from the second network device indicating whether the requested second block of addresses is available to be assigned for use by the local DHCP server in allocating addresses from the requested second block to the one or more subscriber devices coupled to the first network device;

updating, with the first network device, the data that defines the network address pool to reflect that the second block of addresses has been assigned for use by the first network device based on the indication in the response received from the second network device; and automatically configuring, with the first network device, the local DHCP server with the requested second block of addresses so that the local DHCP server allocates one or more of the addresses from the assigned second block to the one or more subscriber devices coupled to the first network device.

6. The method of claim 1, wherein the request to the second network device comprises a request that a block of non-contiguous addresses within the network address pool be assigned for use by the first network device in allocating addresses from the requested block to the one or more subscriber devices coupled to the first network device.

7. The method of claim 1,
wherein the request includes a request bitmap having a bit that corresponds to each address in the network address pool, wherein each bit of the request bitmap indicates whether the first network device has requested that the corresponding address be assigned for use by the first network device, and
wherein the response includes a response bitmap as the indication of whether the requested second block of addresses is available to be assigned for use by the second network device, wherein the response bitmap comprises a bit for each address in the network address pool.

8. The method of claim 1,
wherein the data that defines the network address pool identifies those of the addresses currently assigned for use by the second network device, and
wherein the method further comprises generating the request to request that the block of addresses within the network address pool be assigned for use by the first network device based on the evaluation.

9. The method of claim 8,
wherein receiving a response comprises receiving a response from the second network device indicating that at least one of the requested block of addresses is not available to be assigned for use by the first network device in allocating addresses from the requested block to the one or more subscriber devices coupled to the first network device, and
wherein the method further comprises:
updating, with the first network device, the data that defines the network address pool to identify the at least one addresses of the requested block of addresses is assigned for use by the second network device;
selecting, with the first network device, a different block of addresses from the global address pool to avoid those addresses of the global address pool indicated by the updated data as being assigned for use by the second network device;

transmitting, with the first network device, another request requesting that the different block of addresses within the network address pool be assigned for use by the first network device;

receiving, with the first network device, another response from the second network device indicating whether the requested different block of addresses is available to be assigned for use by the first network device in allocating addresses from the requested block to the one or more subscriber devices coupled to the first network device; and updating, with the first network device, the updated data that defines the network address pool to reflect that the different block of addresses has been assigned for use by the first network device based on the indication in the response received from the second network device.

10. The method of claim 1, further comprising:
periodically generating and transmitting, with the first network device, a first periodic message to the second network device indicating a first set of addresses of the network address pool assigned for use by the first network device;
periodically receiving, with the first network device, a second periodic message from the second network device indicating a second set of addresses of the network address pool assigned for use by the second network device; and
updating, with the first network device, the data that defines the network address pool to indicate that the second set of addresses are assigned for use by the second network device.

11. The method of claim 1,
wherein the data that defines the network address pool identifies a timestamp for each address that indicates a time at which the corresponding address was assigned, and
wherein the method further comprises:
evaluating, with the first network device, each of the timestamps to determine whether the assignment of the corresponding address by the corresponding one of the first and second network devices has timed out; and
updating, with the first network device, the data that defines the network address pool to remove any indication that the corresponding one of the first and second network devices has been assigned the associated one of the addresses in the network address pool based on the evaluation of each of the timestamps.

12. The method of claim 11,
wherein the request comprises a first request for a first block of addresses, and
wherein the method further comprises:
receiving, with the first network device, a second request from the second network device requesting that a second block of addresses within the network address pool be assigned for use by the second network device in allocating addresses from the requested second block to one or more additional subscriber devices coupled to the second network device;
determining, with the first network device, whether the requested second block of addresses is available to be assigned for use by the second network device in allocating addresses from the requested second block to the one or more additional subscriber devices coupled to the second network device;
updating, with the first network device, the data that defines the network address pool to reflect that the second block of addresses has been assigned for use by the second network device based on the determination of whether the requested second block of addresses is available; and transmitting, with the first network device, a response to the second network device indicating whether the requested second block of addresses is available to be assigned for use by the second network device in allocating addresses from the requested second block to the one or more additional subscriber devices coupled to the second network device.

13. The method of claim 12, wherein the second request includes a request bitmap having a bit that corresponds to each address in the network address pool, wherein each bit of the request bitmap indicates whether the second network device has requested that the corresponding address be assigned for use by the second network device, wherein the data that defines the network address pool includes an assigned bitmap having a bit that corresponds to each address in the network address pool, wherein each bit of the reserved bitmap indicates whether the first network device has been assigned the corresponding address, wherein determining whether the requested second block of addresses is available comprises performing a bitwise AND operation between the request bitmap and the assigned bitmap to generate a response bitmap, and wherein the second response includes the response bitmap as the indication of whether the requested second block of addresses is available to be assigned for use by the second network device.

14. The method of claim 1, further comprising:

receiving, with the first network device, configuration data that defines the network address pool;

configuring, with the first network device, the network address pool by storing the data that defines the network address pool defined by the configuration data; and after configuring the network address pool, dynamically joining, with the first network device, the network address pool by transmitting the request to the second network device requesting that the block of addresses within the configured network address pool be assigned for use by the first network device.

15. A network device comprising:

a control unit that stores data that defines 1) a network address pool provided for use in allocation by both a first network device servicing a first sub-network and a second network device servicing a second sub-network different from the first sub-network and 2) individual addresses of the network address pool assigned for use by the first or second network device in allocating the respective individual addresses to one or more subscriber devices coupled to the first or second network device, wherein the network device comprises the first network device, and wherein the control unit includes a shared pool manager module that evaluates the data that defines the network address pool to determine a block of addresses identified by the data that defines the network address pool that is not currently assigned for use by the second network device in allocating addresses from the identified particular block of addresses to the one or more subscriber devices coupled to the second network device; and at least one interface that transmits a request to the second network device requesting that the determined block of addresses within the network address pool be assigned for use by the first network device in allocating addresses from the requested block to the one or more subscriber devices coupled to the first network device, and receives a response from the second network device indicating whether one or more addresses of the requested block of addresses is available to be assigned for use by the first network device in allocating addresses from the requested block to the one or more subscriber devices coupled to the first network device, wherein the shared pool manager module updates the data that defines the network address pool to reflect that the block of addresses has been assigned for use by the first network device based on the indication in the response received from the second network device, and wherein the control unit, when the data has been updated to reflect that the block of addresses has been assigned for use by the first network device, allocates one or more addresses from the assigned block of addresses in response to a request by one of the one or more subscriber devices coupled to the first network for one or more addresses.

16. The network device of claim 15, wherein the first network device includes a router that implements a local dynamic host configuration protocol (DHCP) server, wherein the at least one interface receives a response from the second network device indicating that the requested block of addresses is available to be assigned for use by the first network device in allocating addresses from the reserved block to the one or more subscriber devices coupled to the first network device, wherein the shared pool manager module updates the data that defines the network address pool to reflect that the block of addresses has been assigned for use by the first network device based on the indication that the requested block of addresses is available to be assigned for use by the first network device and automatically configuring the local DHCP server with the requested block of addresses so that the local DHCP server allocates one or more of the addresses from the assigned block to the one or more subscriber devices coupled to the first network device.

17. The network device of claim 16, wherein the local DHCP server receives a DHCP discover message from one of the subscriber devices coupled to the first network device that requests the one or more addresses and generates a DHCP offer message that offers one or more of the addresses from the assigned block to the requesting one of the subscriber devices from which the DHCP discover message was received, wherein the at least one interface forwards the DHCP offer message to the requesting one of the subscriber devices and, after forwarding the DHCP offer message, receives a DHCP request message from the requesting one of the subscriber devices requesting the one or more addresses offered by the DHCP offer message, wherein the local DHCP server generates and forwards a DHCP acknowledgement message acknowledging that the one or more addresses requested by the requesting one of the subscriber devices has been allocated to the subscriber device to use in accessing a computer network.

18. The network device of claim 17, wherein the shared pool manager module includes a DHCP intercept module that monitors each of the DHCP discover, offer, request and acknowledgment messages within the first sub-network and updates the data that defines the network address pool to indicate that the address of the assigned block has been consumed by the requesting one of the subscriber devices.

19. The network device of claim 18,
wherein the request comprises a first request that requests a first block of addresses,
wherein the response comprises a first response, and
wherein the shared pool manager module evaluates the data that defines the network address pool to determine an extent to which the addresses of the assigned block have been consumed by the one or more subscriber devices coupled to the first network device,
wherein the at least one interface transmits a second request to the second network device requesting that a second block of addresses within the network address pool be assigned for use by the local DHCP server based on the evaluation and receives a second response from the second network device indicating whether the requested second block of addresses is available to be assigned for use by the local DHCP server in allocating addresses from the requested second block to the one or more subscriber devices coupled to the first network device, and
wherein the shared pool manager module updates the data that defines the network address pool to reflect that the second block of addresses has been assigned for use by the first network device based on the indication in the response received from the second network device and automatically configures the local DHCP server with the requested second block of addresses so that the local DHCP server allocates one or more of the addresses from the assigned second block to the one or more subscriber devices coupled to the first network device.

20. The network device of claim 15, wherein the request to the second network device comprises a request that a block of non-contiguous addresses within the network address pool be assigned for use by the first network device in allocating addresses from the requested block to the one or more subscriber devices coupled to the first network device.

21. The network device of claim 15,
wherein the request includes a request bitmap having a bit that corresponds to each address in the network address pool, wherein each bit of the request bitmap indicates whether the first network device has requested that the corresponding address be assigned for use by the first network device, and
wherein the response includes a response bitmap as the indication of whether the requested second block of addresses is available to be assigned for use by the second network device, wherein the response bitmap comprises a bit for each address in the network address pool.

22. The network device of claim 15,
wherein the data that defines the network address pool identifies those of the addresses currently assigned for use by the second network device, and
wherein the shared pool manager includes a request module that generates the request to request that the block of addresses within the network address pool be assigned for use by the first network device based on the evaluation.

23. The network device of claim 22,
wherein the shared pool manager includes a response module that receives a response from the second network device indicating that at least one of the requested block of addresses is not available to be assigned for use by the first network device in allocating addresses from the requested block to the one or more subscriber devices coupled to the first network device,
wherein the shared pool manager also includes a conflict resolution module that updates the data that defines the network address pool to identify the at least one addresses of the requested block of addresses is assigned for use by the second network device and selects a different block of addresses from the global address pool to avoid those addresses of the global address pool indicated by the updated data as being assigned for use by the second network device, and
wherein the shared pool manager transmits another request requesting that the different block of addresses within the network address pool be assigned for use by the first network device, receives another response from the second network device indicating whether the requested different block of addresses is available to be assigned for use by the first network device in allocating addresses from the requested block to the one or more subscriber devices coupled to the first network device, and updates the updated data that defines the network address pool to reflect that the different block of addresses has been assigned for use by the first network device based on the indication in the response received from the second network device.

24. The network device of claim 15, wherein the shared pool manager includes a periodic message module that periodically generates and transmits via the at least one interface a first periodic message to the second network device indicating a first set of addresses of the network address pool assigned for use by the first network device, periodically receives via the at least one interface a second periodic message from the second network device indicating a second set of addresses of the network address pool assigned for use by the second network device, and updates the data that defines the network address pool to indicate that the second set of addresses are assigned for use by the second network device.

25. The network device of claim 15,
wherein the data that defines the network address pool identifies a timestamp for each address that indicates a time at which the corresponding address was assigned, and
wherein the shared pool manager module includes a timeout module that evaluates each of the timestamps to determine whether the assignment of the corresponding address by the corresponding one of the first and second network devices has timed out; and updates the data that defines the network address pool to remove any indication that the corresponding one of the first and second network devices has been assigned the associated one of the addresses in the network address pool based on the evaluation of each of the timestamps.

26. The network device of claim 25,
wherein the request comprises a first request for a first block of addresses, and
wherein the shared pool manager module receives via the at least one interface a second request from the second network device requesting that a second block of addresses within the network address pool be assigned for use by the second network device in allocating addresses from the requested second block to one or more additional subscriber devices coupled to the second network device, determines whether the requested second block of addresses is available to be assigned for use by the second network device in allocating addresses from the requested second block to the one or more additional subscriber devices coupled to the second network device, and updates the data that defines the network address pool to reflect that the second block of addresses has been assigned for use by the second network device based on the determination of whether the requested second block of addresses is available, and wherein the at least one interface transmits a response to the second network device indicating whether the requested second block of addresses is available to be assigned for use by the second network device in allocating addresses from the requested second block to the one or more additional subscriber devices coupled to the second network device.

27. The network device of claim 26, wherein the second request includes a request bitmap having a bit that corresponds to each address in the network address pool, wherein each bit of the request bitmap indicates whether the second network device has requested that the corresponding address be assigned for use by the second network device, wherein the data that defines the network address pool includes an assigned bitmap having a bit that corresponds to each address in the network address pool, wherein each bit of the reserved bitmap indicates whether the first network device has been assigned the corresponding address, wherein the shared pool manager module includes a request module that performs a bit-wise AND operation between the request bitmap and the assigned bitmap to generate a response bitmap, and wherein the second response includes the response bitmap as the indication of whether the requested second block of addresses is available to be assigned for use by the second network device.

28. The network device of claim 15, wherein the control unit includes a user interface module that receives configuration data that defines the network address pool, wherein the control unit stores the data to the shared pool manager to defines the network address pool defined by the configuration data, wherein the shared pool manager, after configuring the network address pool, dynamically joins the network address pool by transmitting the request to the second network device requesting that the block of addresses within the configured network address pool be assigned for use by the first network device.

29. A network system comprising:

a first set of subscriber devices;

a first network device servicing a first sub-network, coupled to the first set of subscriber devices;

a second set of subscriber devices different from the first set of subscriber devices; and a second network device different from the first network device, servicing a second sub-network different from the first sub-network, that couples to the second set of subscriber devices, wherein the first network device includes:

a control unit that stores data that defines 1) a network address pool provided for use in allocation by both the first network device and the second network device and 2) individual addresses of the network address pool assigned for use by the first or second network device in allocating the respective individual addresses to one or more subscriber devices coupled to the first or second network device, and wherein the control unit includes a shared pool manager module that evaluates the data that defines the network address pool to determine a block of addresses identified by the data that defines the network address pool that is not currently assigned for use by the second network device in allocating addresses from the identified particular block of addresses to the one or more subscriber devices coupled to the second network device; and at least one interface that transmits a request to the second network device requesting that the determined block of addresses within the network address pool be assigned for use by the first network device in allocating addresses from the requested block to the one or more subscriber devices coupled to the first network device, and receives a response from the second network device indicating whether one or more addresses of the requested block of addresses is available to be assigned for use by the first network device in allocating addresses from the requested block to the one or more subscriber devices coupled to the first network device, wherein the shared pool manager module updates the data that defines the network address pool to reflect that the block of addresses has been assigned for use by the first network device based on the indication in the response received from the second network device, and wherein the control unit, when the data has been updated to reflect that the block of addresses has been assigned for use by the first network device, allocates one or more addresses from the assigned block of addresses in response to a request by one of the one or more subscriber devices coupled to the first network device for one or more addresses.

30. A non-transitory computer-readable medium comprising instructions for causing a programmable processor to:

store, with a first network device, data that defines 1) a network address pool provided for use in allocation by both the first network device servicing a first sub-network and a second network device servicing a second sub-network different from the first sub-network and 2) individual addresses of the network address pool assigned for use by the first or second network device in allocating the respective individual addresses to one or more subscriber devices coupled to the first or second network device;

evaluate, with the first network device, the data that defines the network address pool to determine a block of addresses identified by the data that defines the network address pool that is not currently assigned for use by the second network device in allocating addresses from the identified particular block of addresses to the one or more subscriber devices coupled to the second network device;

transmit, with the first network device, a request to the second network device requesting that the determined block of addresses within the network address pool be assigned for use by the first network device in allocating addresses from the requested block to the one or more subscriber devices coupled to the first network device;

receive, with the first network device, a response from the second network device indicating whether one or more addresses of the requested block of addresses is available to be assigned for use by the first network device in allocating addresses from the requested block to the one or more subscriber devices coupled to the first network device;

update, with the first network device, the data that defines the network address pool to reflect that the block of addresses has been assigned for use by the first network device based on the indication in the response received from the second network device; and when the data has been updated to reflect that the block of addresses has been assigned for use by the first network device, allocate one or more addresses from the assigned block of addresses with the first network device in response to a request by one of the one or more subscriber devices coupled to the first network device for one or more addresses.

* * * * *